US007009775B2

(12) United States Patent
Togino

(10) Patent No.: US 7,009,775 B2
(45) Date of Patent: Mar. 7, 2006

(54) EYEPIECE OPTICAL SYSTEM, AND DISPLAY DEVICE USING THE EYEPIECE OPTICAL SYSTEM

(75) Inventor: Takayoshi Togino, Koganei (JP)

(73) Assignee: Olympus Corporation, Tokyo (JP)

( * ) Notice: Subject to any disclaimer, the term of this patent is extended or adjusted under 35 U.S.C. 154(b) by 0 days.

(21) Appl. No.: 10/418,281

(22) Filed: Apr. 18, 2003

(65) Prior Publication Data

US 2004/0207927 A1 Oct. 21, 2004

(51) Int. Cl.

| | |
|---|---|
| ***G02B 25/00*** | (2006.01) |
| ***G02B 27/14*** | (2006.01) |
| ***G02B 3/08*** | (2006.01) |
| ***G09G 5/00*** | (2006.01) |
| ***G03B 21/14*** | (2006.01) |

(52) U.S. Cl. ...................... 359/643; 359/630; 359/631; 359/742; 345/7; 345/8; 353/38

(58) Field of Classification Search ................ 359/742, 359/743, 643, 647, 726–736, 630–633, 364–366; 345/7, 8; 353/38

See application file for complete search history.

(56) References Cited

U.S. PATENT DOCUMENTS 3,628,854 A * 12/1971 Jampolsky .................. 351/175
5,706,137 A * 1/1998 Kelly ......................... 359/633
6,252,728 B1 6/2001 Togino ....................... 359/834
6,693,749 B1 * 2/2004 King et al. ................. 359/630
6,747,639 B1 * 6/2004 So ............................. 345/211

FOREIGN PATENT DOCUMENTS

JP 48-102527 12/1973
JP 05-303054 11/1993
JP 05-303055 11/1993
JP 07-270781 10/1995
JP 09-139901 5/1997
JP 2000-221440 8/2000
JP 2002-268005 9/2002
JP 2003202502 A * 7/2003

* cited by examiner

OTHER PUBLICATIONS

Definition of Fresnel lens provided in the Laurin Photonics Dictionary at http://www.photonics.com/dictionary.*

*Primary Examiner*—Georgia Epps
*Assistant Examiner*—Jack Dinh
(74) *Attorney, Agent, or Firm*—Kenyon & Kenyon

(57) ABSTRACT

The invention relates to a display system wherein a Fresnel lens that forms an eyepiece optical system is curved to correct for decentration aberration, whereby a display screen can be wholly observed even in a decentered state. In the display system, an object image is projected via a relay optical system 2 near the eyepiece optical system 1 so that the exit pupil E1 of the relay optical system 2 is projected via the eyepiece optical system 1 onto an observer's pupil position E0. The eyepiece optical system comprises an optical element having a Fresnel surface. The eyepiece optical system 1 and relay optical system 2 are located such that an axial chief ray emerging from the relay optical system 2 is obliquely incident on the eyepiece optical system 1. The axial chief ray is defined by a light ray emerging from the center of the object, and passing through the relay optical system 2 and then through the center of the pupil E1 of the relay optical system 2. The optical element that forms the eyepiece optical system 1 is curved such that decentration aberration of pupil aberrations occurring at the eyepiece optical system 1 is corrected.

8 Claims, 19 Drawing Sheets

EYEPIECE OPTICAL SYSTEM, AND DISPLAY DEVICE USING THE EYEPIECE OPTICAL SYSTEM

BACKGROUND OF THE INVENTION

The present invention relates generally to a display system, and more particularly to a display system of compact size and low power consumption.

Among compact display systems, there is a direct-viewing type liquid crystal display system. These compact display systems, for the most part, are used with cellular phones and portable terminals. For high-definition display purposes, on the one hand, display systems comprising an increased number of pixels are needed. For moving image display purposes, on the other hand, display systems having fast display speeds are required. Such requirements are satisfied by use of active matrix liquid crystals. However, the active matrix liquid crystals are expensive, and consume large power with the need of large capacity batteries for presenting displays over an extended period of time.

Some arrangements using a small display device and designed to present images appearing on that display device on an enlarged scale through an optical system are disclosed in JP-A 48-102527, and JP-A 5-303054 filed by the applicant. In these arrangements, the images appearing on the display systems are magnified through a concave mirror and displayed as virtual images. In the latter arrangement in particular, a non-rotationally symmetric reflecting surface is used to obtain projected images with reduced aberrations.

There is also available a projection optical system proposed by the applicant in JP-A's 5-303055 and 2000-221440. In this projection optical system, an image displayed on a display device is once projected in midair to form a projected image. Then, the projected image is magnified by a concave mirror for display purposes.

Display systems, for instance, are disclosed in JP-A's 7-270781 and 9-139901.

Further, the applicant has already field Japanese Patent Application No. 2001-66669 to come up with a compact, low power consumption display system. In this display system, a relay optical system and an eyepiece optical system are used to set up an optical system. In this optical system, the relay optical system comprises a decentering prism optical system. Then, an image or its intermediate image (hereinafter called simply the image) appearing on the display device is projected near the eyepiece optical system. The eyepiece optical system also serves to converge a light beam from the relay optical system toward the eyeball of an observer. At this time, the eyepiece optical system projects the exit pupil of the relay optical system onto a given position. Here the given position is understood to mean the position of the eyeball of the observer upon observation.

For the optical system comprising a relay optical system and an eyepiece optical system, the eyepiece optical system must be decentered so as to reduce its overall size. Then, the relay optical system is located such that light rays emerging therefrom are obliquely incident on the eyepiece optical system. The relay optical system is also positioned such that its exit pupil is located at either one of two focuses F, F' of such a spheroid as shown in FIG. 1. In this state, the eyeball of the observer is brought in alignment with the position of another focus (F or F'). Even in the decentered arrangement, there is thus no pupil aberration at all.

However, the eyepiece optical system must be constructed of a large concave mirror that has a large thickness and so offers troublesome problems in connection with portability and handleability.

To avoid these problems, it is known to construct the eyepiece optical system using a transmission or reflection type Fresnel lens.

SUMMARY OF THE INVENTION

The present invention provides an eyepiece optical system comprising a substrate with a Fresnel surface formed thereon, wherein:

the Fresnel surface comprises rotationally symmetric concentric zones, and the substrate includes at least a curved area.

The present invention provides an eyepiece optical system comprising a substrate with a Fresnel surface formed thereon, wherein the Fresnel surface comprises a rotationally symmetric concentric zone, and the substrate is configured in a plane-parallel shape, and a holder member for holding the substrate in place, wherein the holder member has a recess in which the substrate is held.

Further, the present invention provides a display system comprising:

a display device comprising a display part on which an image is to be displayed, a relay optical system for projection of the image, and the aforesaid eyepiece optical system, wherein:

the relay optical system and the eyepiece optical system are located such that an axial chief ray emerging from the relay optical system is obliquely incident on the eyepiece optical system.

It is here noted that the axial chief ray is defined by a light ray that emerges from the center of the display part, and passes through the relay optical system, passing through the center of an exit pupil of the relay optical system.

Still other objects and advantages of the invention will in part be obvious and will in part be apparent from the specification.

The invention accordingly comprises the features of construction, combinations of elements, and arrangement of parts, which will be exemplified in the construction hereinafter set forth, and the scope of the invention will be indicated in the claims.

DESCRIPTION OF THE PREFERRED EMBODIMENTS

Figure 1:
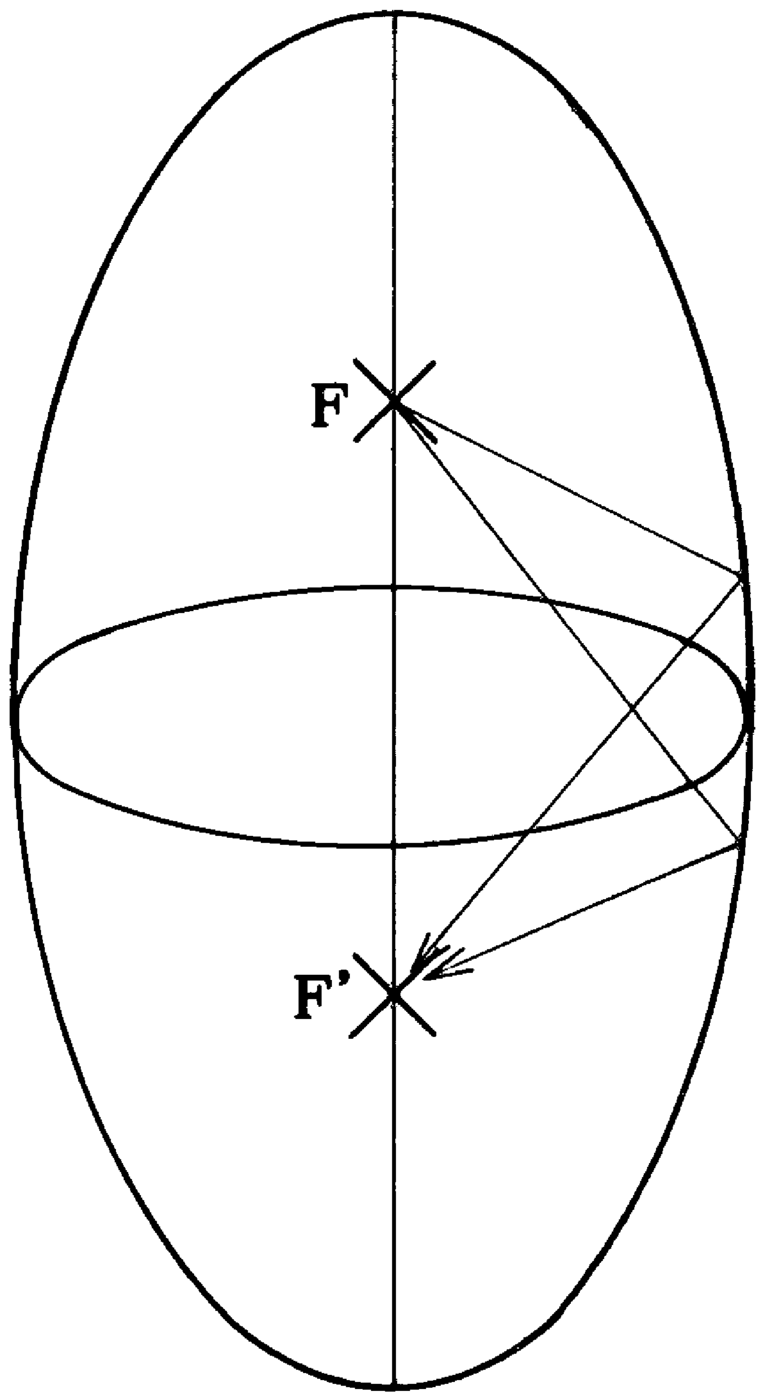
FIG. 1 is illustrative of two focuses of a spheroid.
Figure 2A:
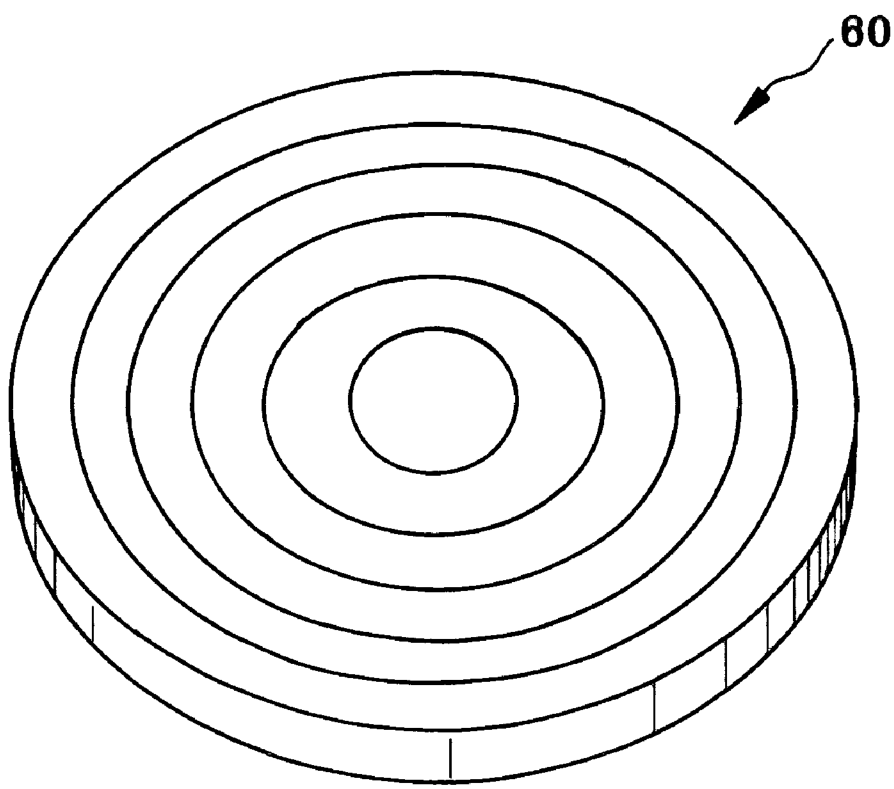
FIGS. 2(*a*) and 2(*b*) are illustrative in schematic of the Fresnel surface used in the present invention.
Figure 2B:

First of all, the Fresnel surface used herein is explained. A Fresnel surface is defined by a basic curved surface that is cut into a number of slender ring-like faces, in which the slender ring-like faces are arranged in the form of zones. The Fresnel surface used herein is defined by a basic curved surface of rotationally symmetric shape, as shown in FIGS. 2(*a*) and 2(*b*). FIG. 2(*a*) is a perspective view of a Fresnel surface 60 used herein, and FIG. 2(*b*) is a longitudinally sectioned view of one section of the Fresnel surface 60, including its center.

In the embodiment of FIG. 2(*a*), a rotationally symmetric Fresnel surface is achieved by making the Fresnel pitch conform to a rotationally symmetric spherical shape. The Fresnel surface 60, if configured in the form of a refracting surface, provides a Fresnel transmitting surface, and if configured in the form of a reflecting surface, provides a Fresnel reflecting surface. The Fresnel reflecting surface is also obtainable by using the Fresnel surface 60 as a Fresnel transmitting surface and locating another optical surface in proximity to the Fresnel transmitting surface as a reflecting surface.

A reflecting mirror having such a Fresnel reflecting surface provides a Fresnel reflecting mirror. On the other hand, a lens having the Fresnel transmitting surface provides a Fresnel lens. As can be appreciated from the examples given later, such a Fresnel reflecting mirror or lens is used herein as an eyepiece optical system.

The eyepiece optical system of the present invention, and the display system using the eyepiece optical system are now explained with reference to their examples. In Example 1 of the present invention, a Fresnel reflecting surface whose Fresnel surface is defined by a spherical surface is used for the eyepiece optical system.

Figure 3:
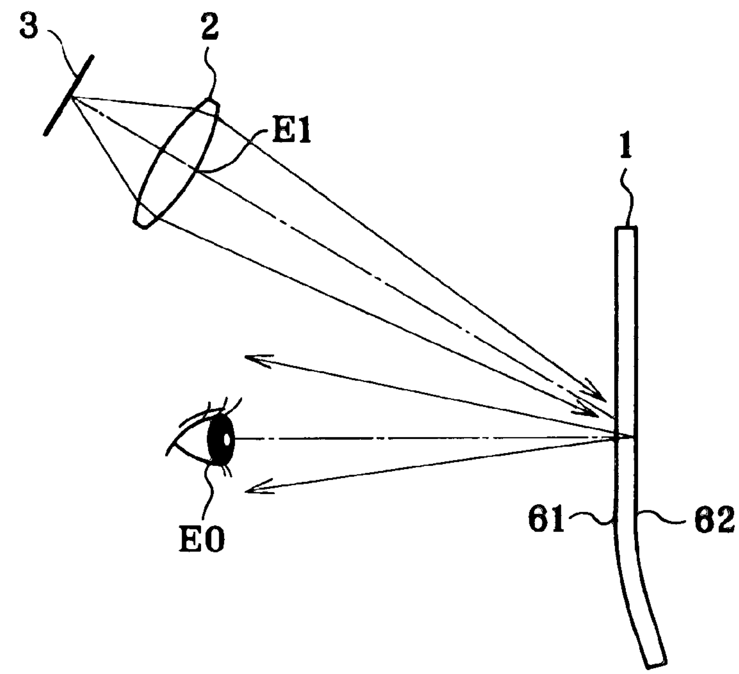
FIG. 3 is illustrative in schematic of a display system constructed by curving the Fresnel reflecting mirror according to Example 1 of the present invention.
Figure 4:
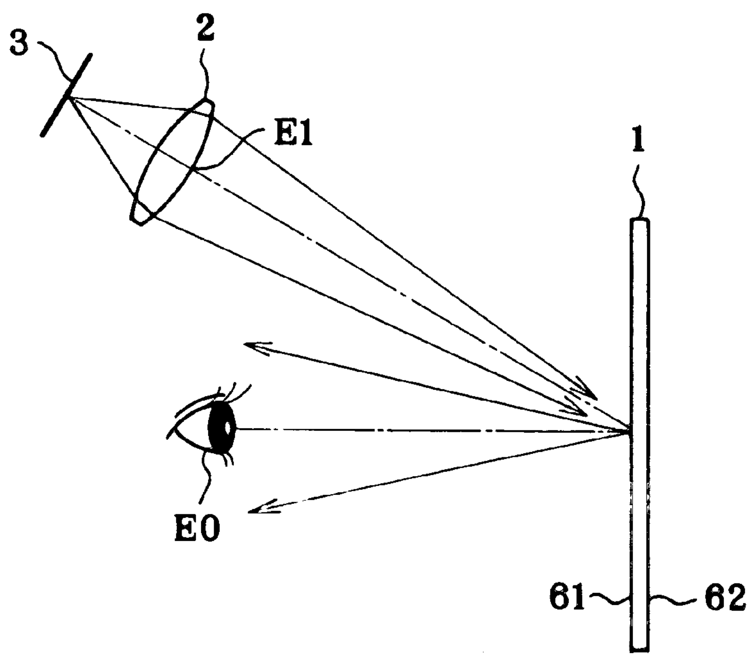
FIG. 4 is illustrative in schematic of a display system in which, in contrast to FIG. 3, the Fresnel reflecting mirror is not curved according to a comparative example to Example 1.
Figure 5:
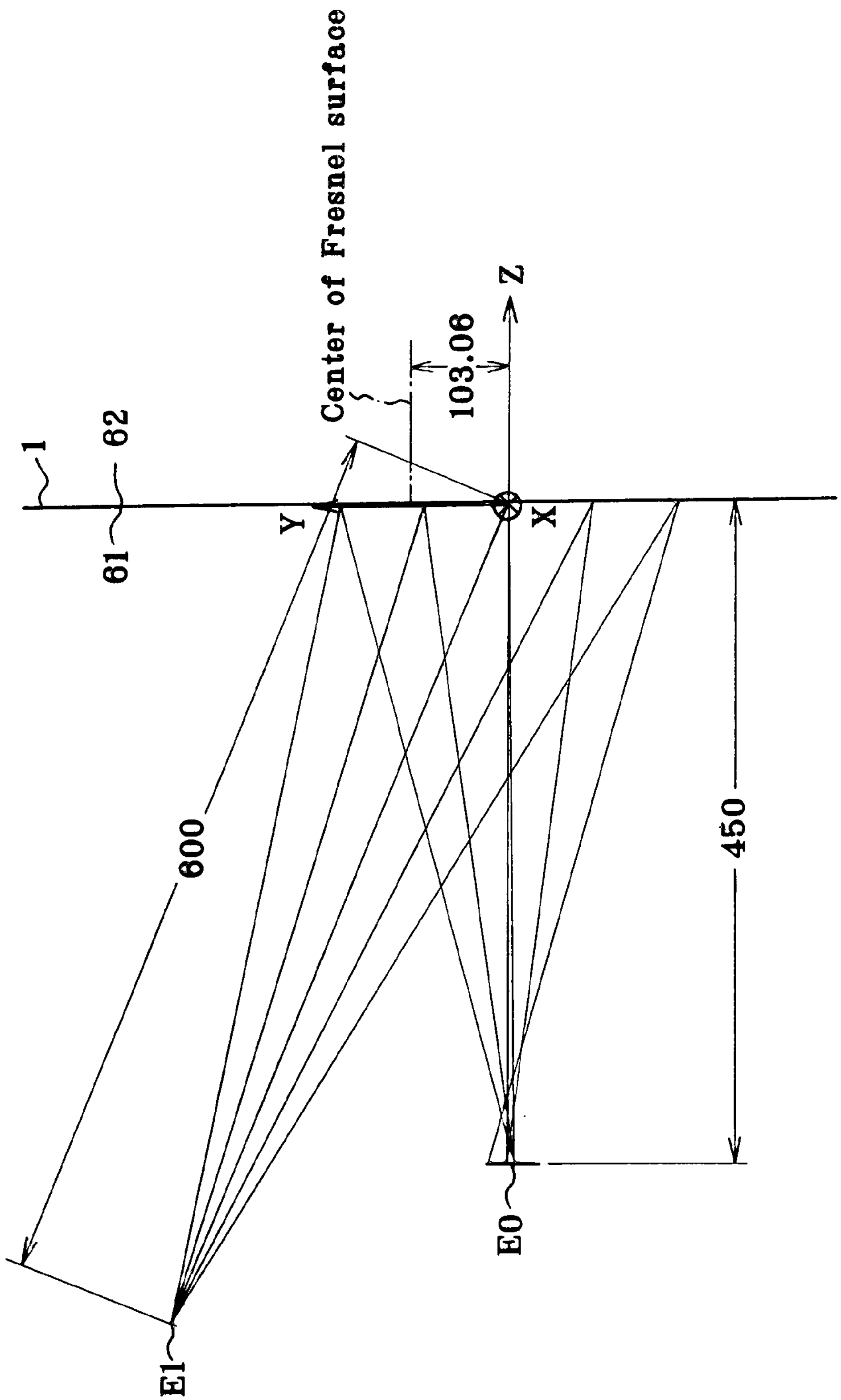
FIG. 5 is an optical path diagram for a Y-Z section of the optical system that underlies Example 1.
Figure 6:
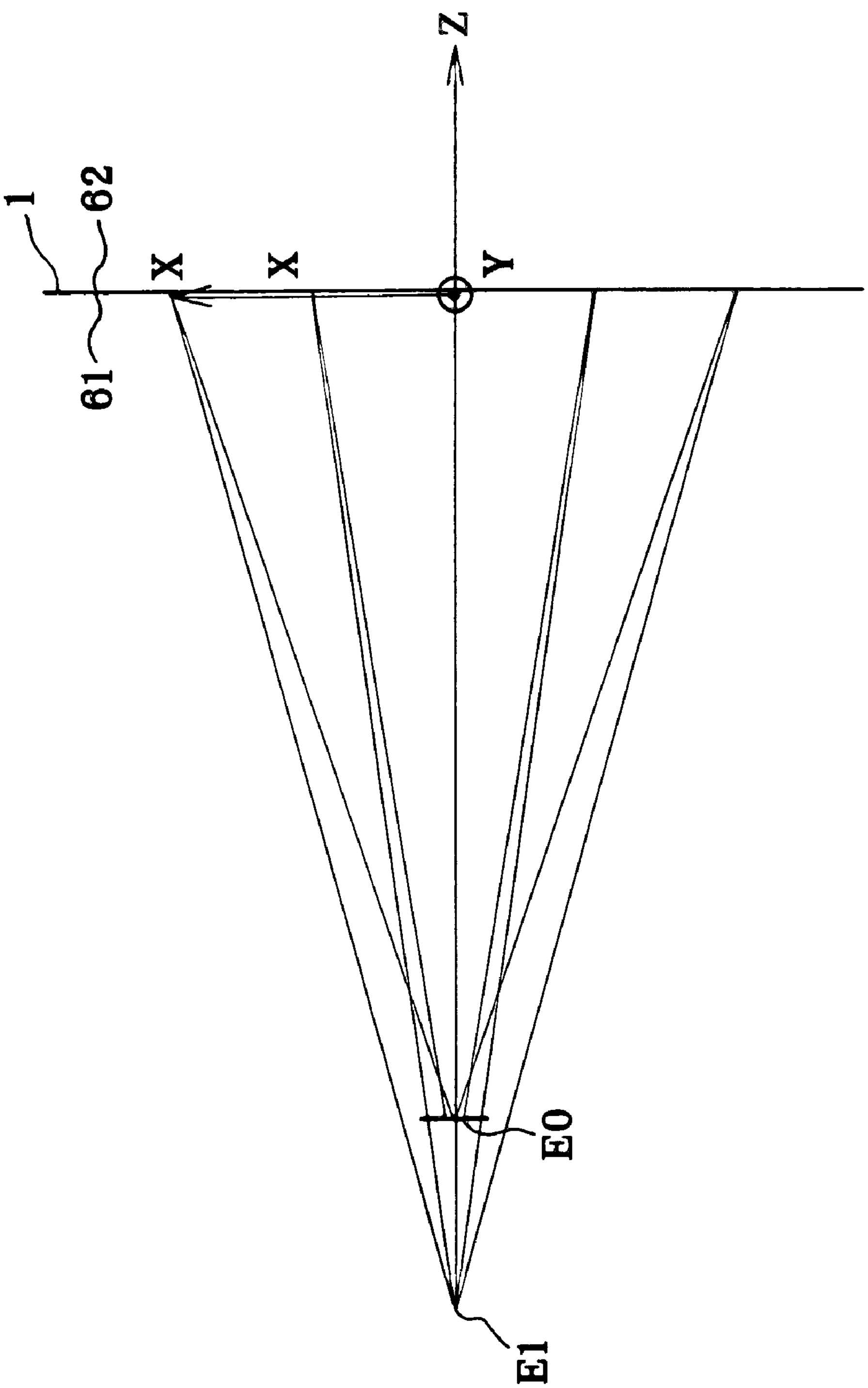
FIG. 6 is a projection optical path as projected onto the X-Z plane of the optical system that underlies the comparative example to Example 1.

FIG. 3 is illustrative of Example 1 of the present invention. FIG. 4 is illustrative of a comparative example for Example 1. FIGS. 5 and 6 are illustrative in detail of the comparative example. FIG. 5 is an optical path diagram for a Y-Z section of the optical system in the comparative example. FIG. 6 is a projection optical path diagram as projected onto the X-Z plane. In FIGS. 5 and 6, the defining coordinates for the second surface (the plane of a Fresnel reflecting mirror 1 on the entrance side) are indicated by X, Y and Z. It is noted that X, Y and Z in FIGS. 5 and 6 stand for coordinate axes; that is, they are not decentering parameters X, Y and Z.

In FIGS. 5 and 6, only essential members, i.e., an exit pupil E1 of a relay optical system, a Fresnel reflecting mirror 1 and a final pupil E0 are shown. The final pupil E0 is an image of the exit pupil E1 of the relay optical system.

The Fresnel reflecting mirror 1 comprises a plane 61 on the entrance side and a Fresnel reflecting surface 62, so that by the Fresnel reflecting mirror 1, the image of the exit pupil El of the relay optical system is formed at a given position where the final pupil E0 is to be formed. That position is also in alignment with the eyeball (pupil) of an observer upon observation, as already described. Thus, the Fresnel reflecting mirror 1 functions as an eyepiece optical system.

Figure 7A:
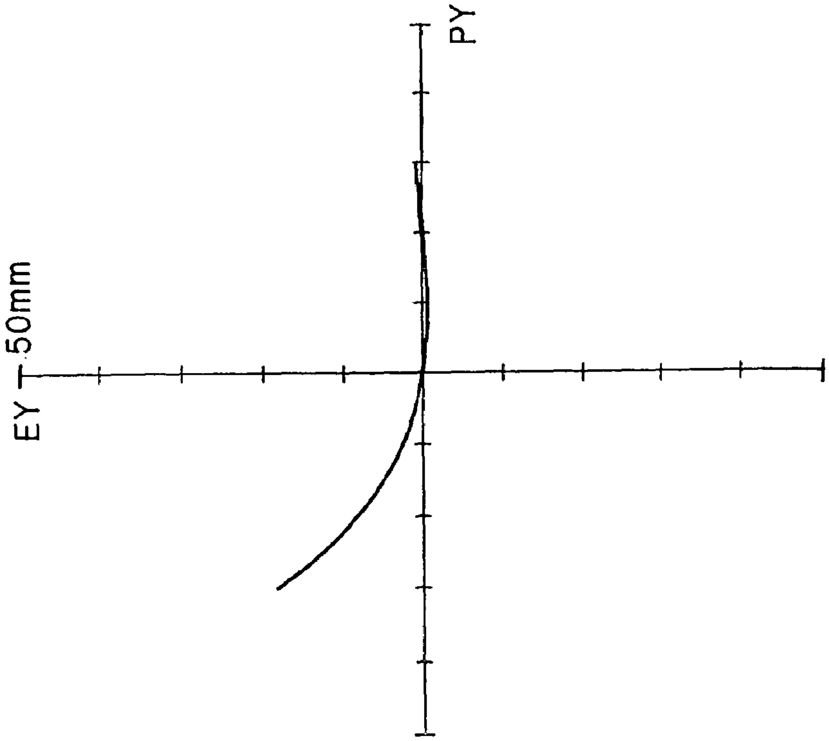
FIGS. 7*a* and 7*b* are decentration aberration diagrams for the comparative example to Example 1.
Figure 7B:
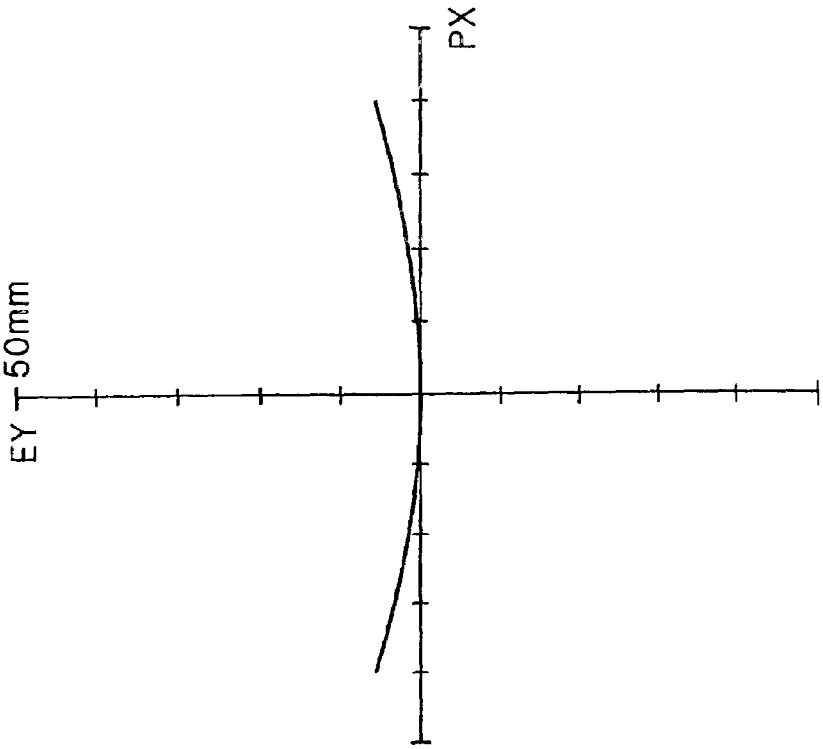
Figure 8:
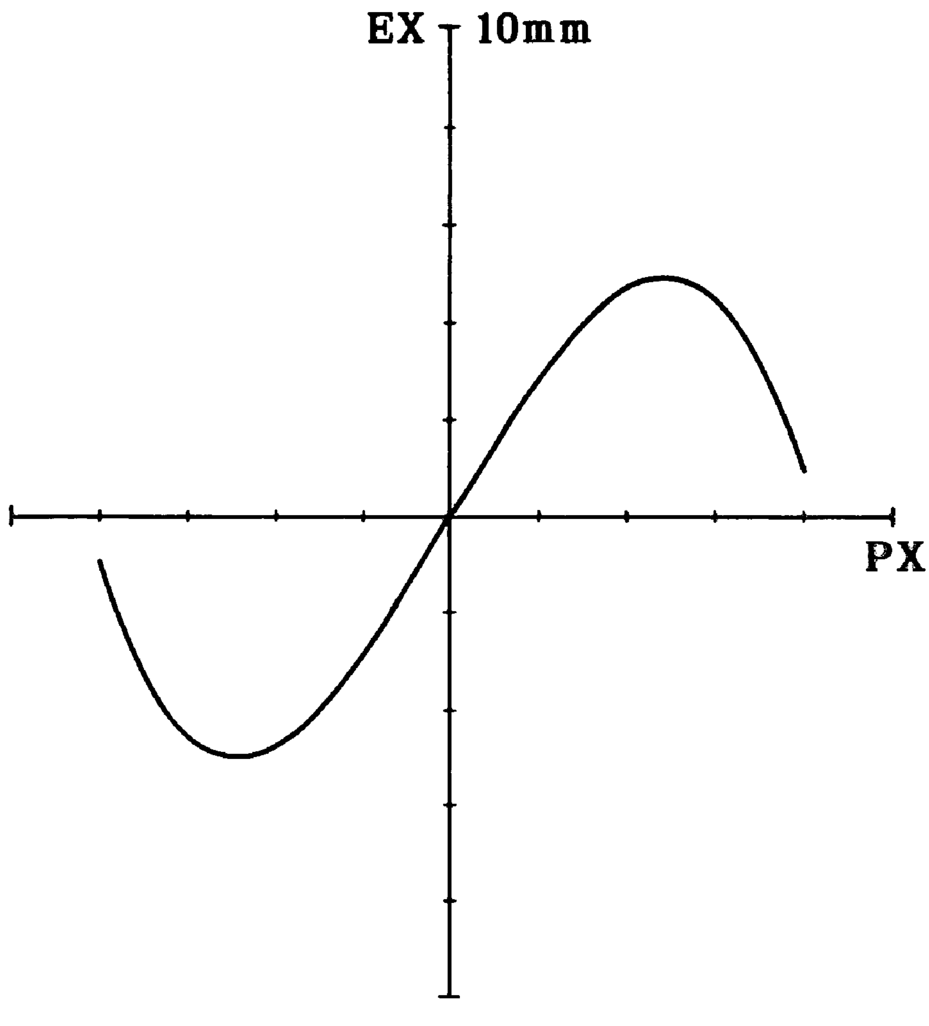
FIG. 8 is a decentration aberration diagram for Example 1.

FIGS. 7(*a*) and 7(*b*) and FIG. 8 are decentration aberration diagrams for the comparative example.

FIG. 7(*a*) is illustrative of aberration when a light ray leaving the exit pupil E1 of the relay optical system is diverted on the Fresnel reflecting mirror 1 in the Y direction (PY). This aberration is indicative of Y-direction aberration (EY) at the position of the final pupil E0. In this case, aberration of about 20 mm at most occurs.

FIG. 7(*b*) is illustrative of aberration when a light ray leaving the exit pupil E1 of the relay optical system is diverted on the Fresnel reflecting mirror 1 in the X direction (PX). This aberration is indicative of Y-direction aberration (EY) at the position of the final pupil E0. In this case, aberration of about 5 mm at most occurs.

FIG. 8 is illustrative of aberration when a light ray leaving the exit pupil E1 of the relay optical system is diverted on the Fresnel reflecting mirror 1 in the X direction (PX). This aberration is indicative of X-direction aberration (EX) at the position of the final pupil E0. In this case, aberration of about 5 mm at most occurs.

It is here noted that the effective diameter of the Fresnel surface 62 is 300 mm in the horizontal (X) direction and 225 mm in the vertical (Y) direction.

In this example, the Fresnel reflecting mirror 1 is so curved that decentration aberration occurring at the Fresnel reflecting mirror 1 is corrected (or compensated)

Referring to FIG. 3, the display system comprises a display device 3 for displaying an image, a relay optical system 2 and a Fresnel reflecting mirror 1. The image appearing on the display device 3 is projected by way of the relay optical system 2 so that a projected image is formed near the Fresnel reflecting mirror 1. The Fresnel reflecting mirror 1 reflects light from the projected image formed near itself and, at the same time, projects an exit pupil E1 of the relay optical system 2 onto the position of a final pupil E0. Thus, the Fresnel reflecting mirror 1 reflects the light from the projected image toward the final pupil E0.

If an observer brings the eyeball in alignment with the position of the final pupil E0, the observer will be capable of viewing the image appearing on the display device 3. At this time, the relay optical system 2 and the Fresnel reflecting mirror 1 take the form of a magnifying optical system. Thus, the observer will be capable of a bright, magnified image.

A difference between the Fresnel reflecting mirror 1 of FIG. 3 and the Fresnel reflecting mirror 1 of the FIG. 4 lies in the shape of their lower end portions. That is, in the Fresnel reflecting mirror 1 of FIG. 3, the lower end portion (−Y portion) of the planar Fresnel reflecting mirror 1 of FIG. 4 is curved away from the final pupil E0. Referring here to FIG. 7(*a*), decentration aberration occurs in a positive direction at a negative position on abscissa (in the Y direction of a display surface (the Fresnel reflecting mirror 1)). By use of the Fresnel reflecting mirror 1 of FIG. 3, it is thus possible to make correction for decentration aberration occurring in the positive direction.

The decentration aberration shown in FIG. 8 is an astigmatic difference caused by decentration. In this state, light rays near the optical axis of the Fresnel reflecting mirror 1 form an image farther off an image plane (farther off the Fresnel reflecting mirror 1 in this case). For correction of this, it is preferable to cylindrically curve the Fresnel reflecting mirror 1. Such a configuration enables correction of the aforesaid decentration aberration.

Figure 9:
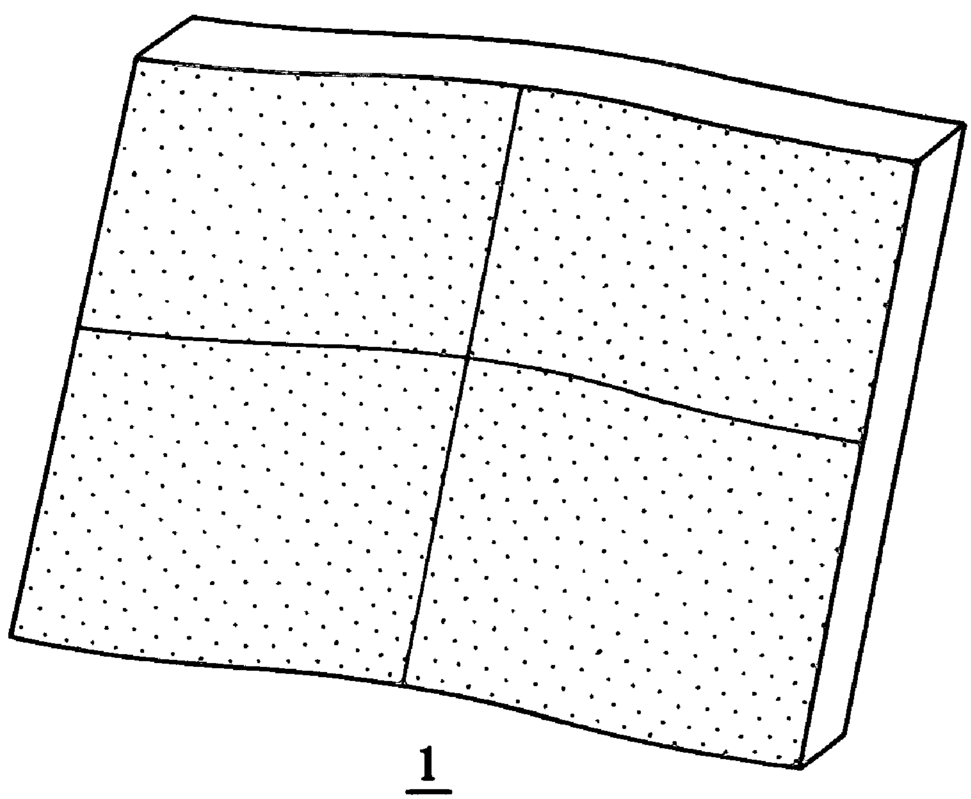
FIG. 9 is illustrative of another embodiment of how to curve the Fresnel reflecting mirror according to Example 1.

More preferably, only the central portion of the reflecting surface of the Fresnel reflecting mirror 1 should be cylindrically configured while the peripheral portion remains in a substantially planar shape, as depicted in FIG. 9. Decentration aberration is susceptible to over-correction at the periphery of the Fresnel reflecting mirror 1; however, such a configuration can foreclose the possibility of over-correction.

Example 2 of the present invention is now explained. Numerical data that underlie this example will be given later. In this example, a Fresnel reflecting mirror having a rotationally symmetric aspheric surface is used for an eyepiece optical system.

Figure 10:
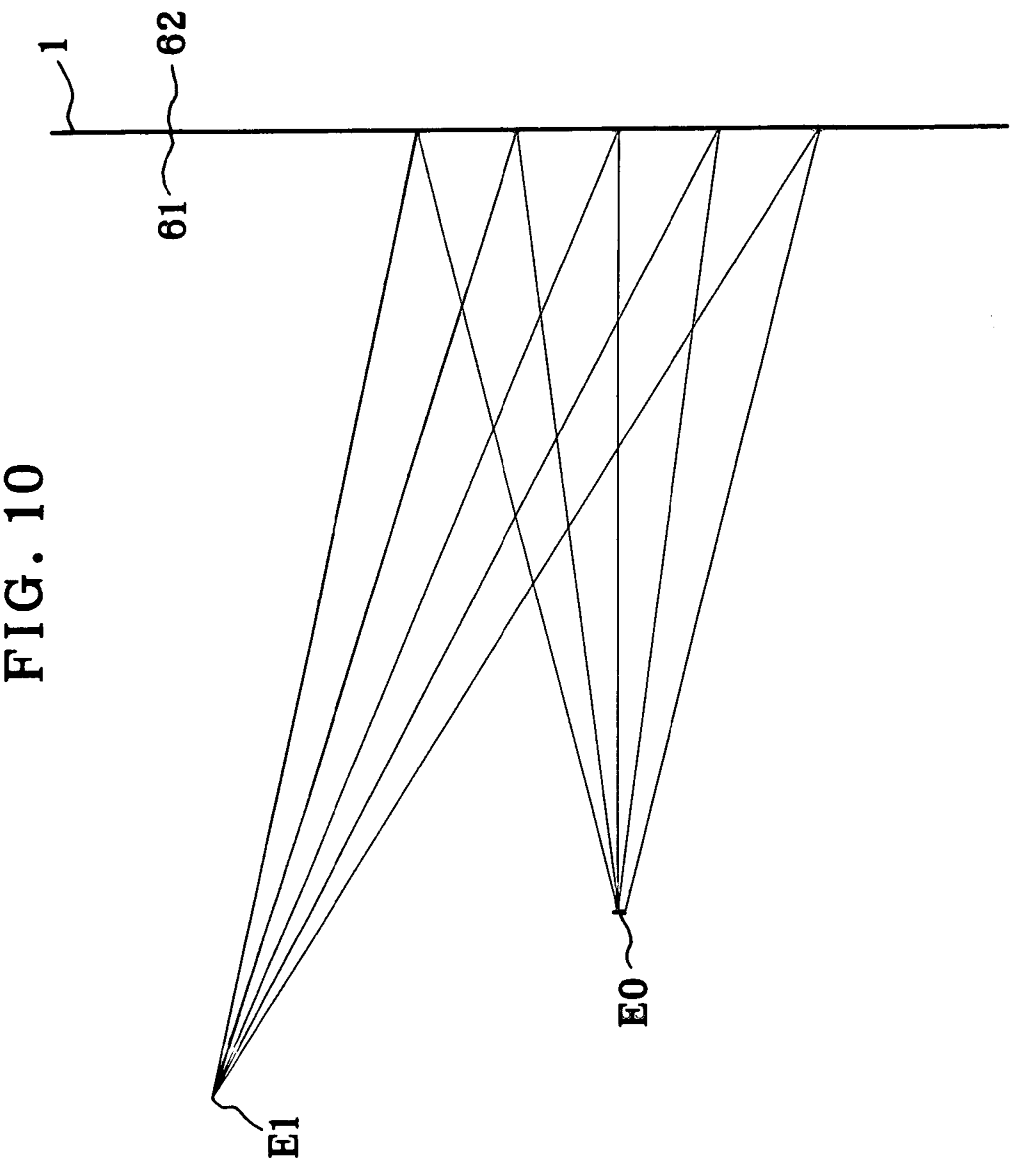
FIG. 10 is an optical path diagram for a Y-Z section of the optical system that underlies Example 2.
Figure 11:
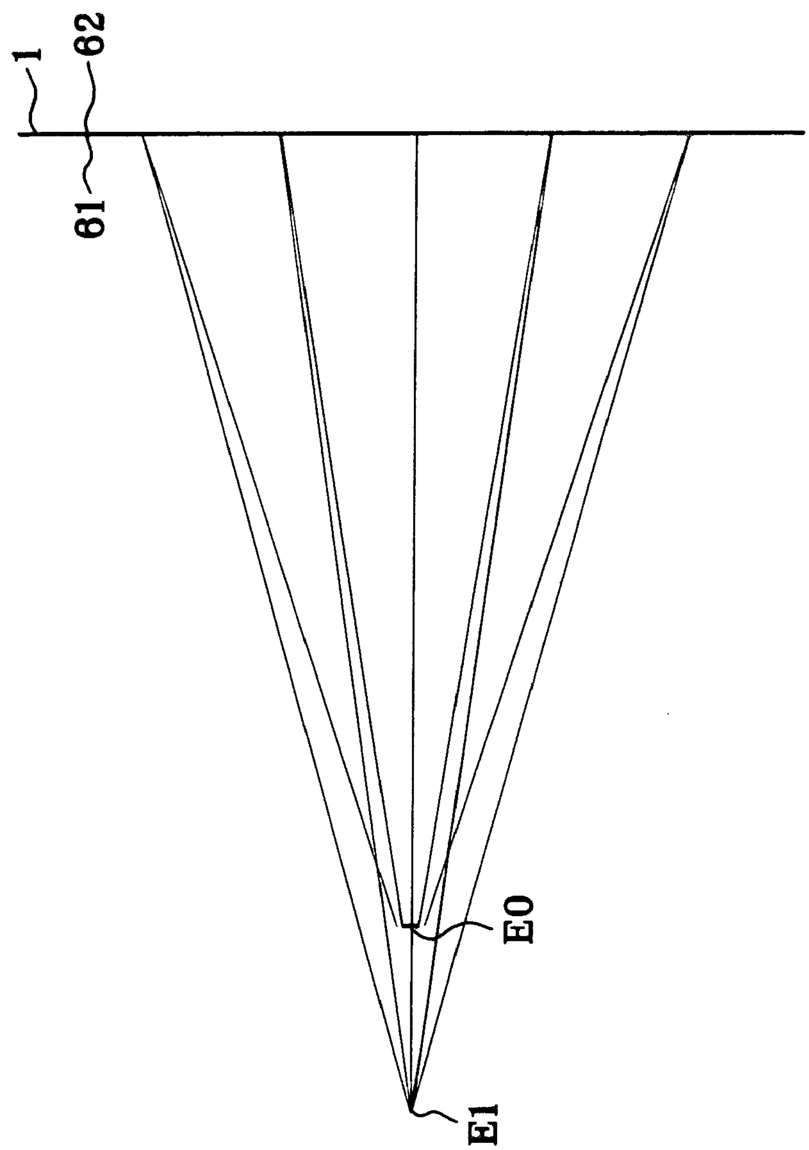
FIG. 11 is a projection optical path as projected onto the X-Z plane of the optical system that underlies Example 2.

FIG. 10 is an optical path diagram for a Y-Z section of the optical system that underlies Example 2, and FIG. 11 is a projection optical path diagram as projected onto an X-Z plane. Only essential members, i.e., an exit pupil E1 of a relay optical system, a Fresnel reflecting mirror 1 and a final pupil E0 are shown in FIGS. 10 and 11.

The Fresnel reflecting mirror 1 comprises a plane 61 on the entrance side and a Fresnel reflecting surface 62, so that by the Fresnel reflecting mirror 1, the image of the exit pupil E1 of the relay optical system is formed at a given position where the final pupil E0 is to be formed. That position is also in alignment with the eyeball (pupil) of an observer upon observation, as already described. Thus, the Fresnel reflecting mirror 1 functions as an eyepiece optical system.

Figure 12B:
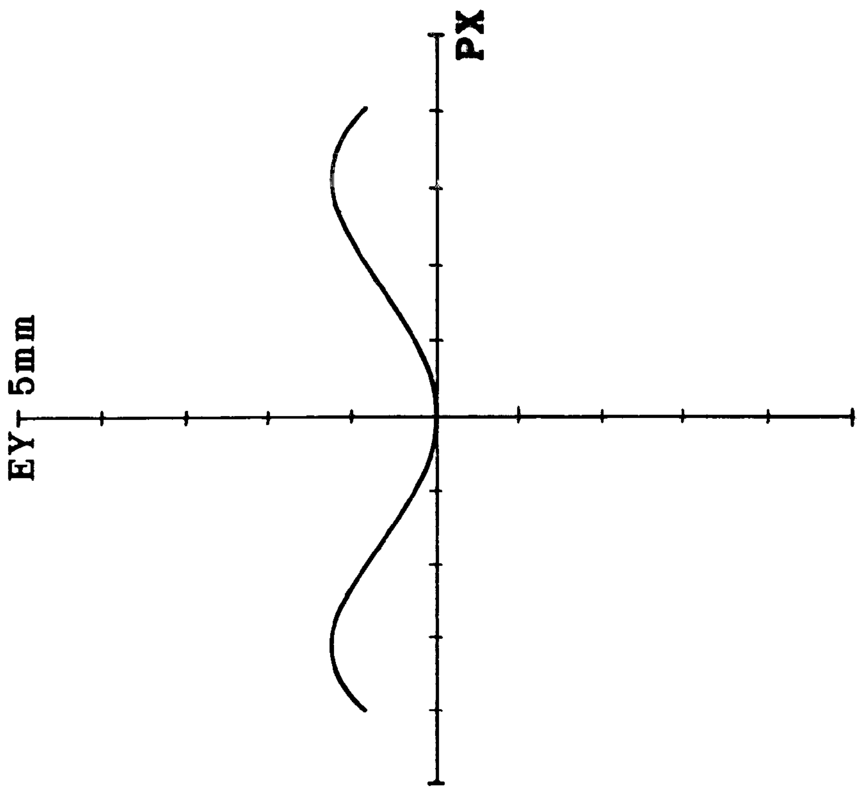
FIGS. 12(*a*) and 12(*b*) are decentration aberration diagrams for Example 2.
Figure 12A:
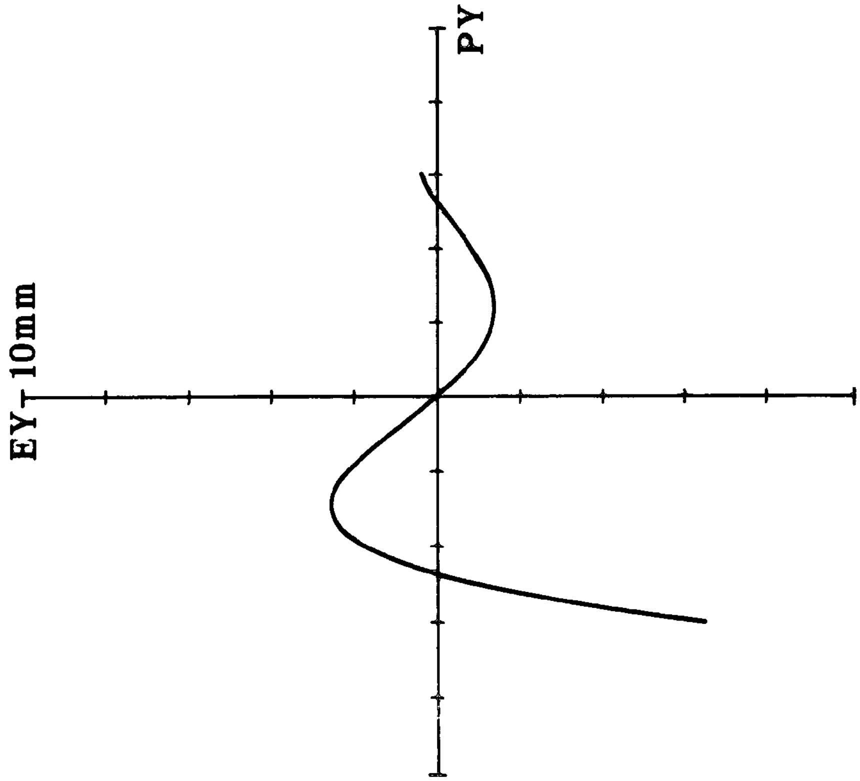
Figure 13:
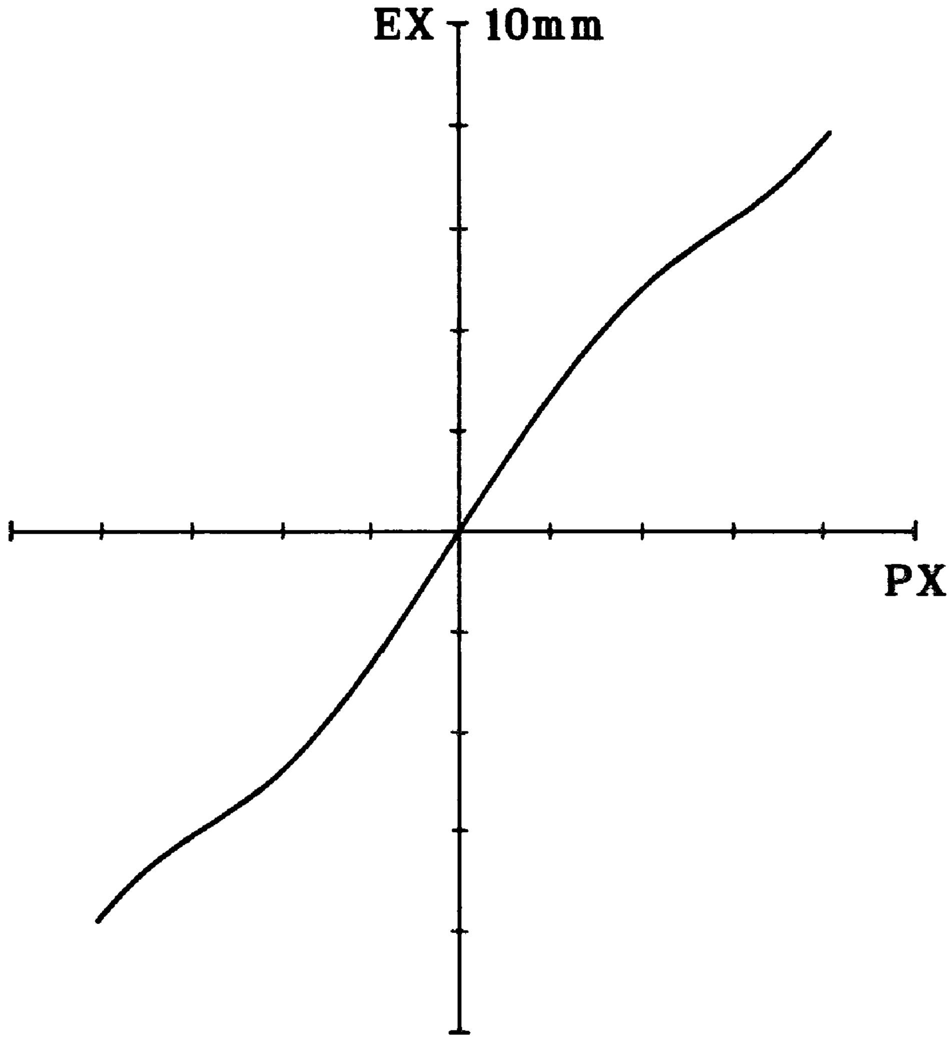
FIG. 13 is a decentration aberration diagram for Example 2.

Decentration aberration in the arrangement of FIG. 10 is depicted in the aberration diagrams, i.e., FIG. 12(*a*), FIG. 12(*b*) and FIG. 13 that are similar to FIG. 7(*a*), FIG. 7(*b*) and FIG. 8, respectively.

The effective diameter of the Fresnel reflecting surface 62 is 300 mm in the horizontal (X) direction and 225 mm in the vertical (Y) direction.

In this example, the Fresnel reflecting surface 62 is configured in the form of a rotationally symmetric aspheric surface. This enables the curvature of the Fresnel surface in the Y direction to be relatively freely determined. It is consequently possible to reduce the amount of decentration aberration produced in this direction as much as possible. This will also be appreciated from the optical path diagram of FIG. 10 showing that the ability of light rays to converge is satisfactory. From FIG. 12(*a*) showing that the amount of decentration aberration is barely about 3 mm, it will be found that the amount of decentration aberration is kept small. It is noted that FIG. 7 differs from FIG. 12 in terms of the value of a graduation on ordinate.

Figure 14:
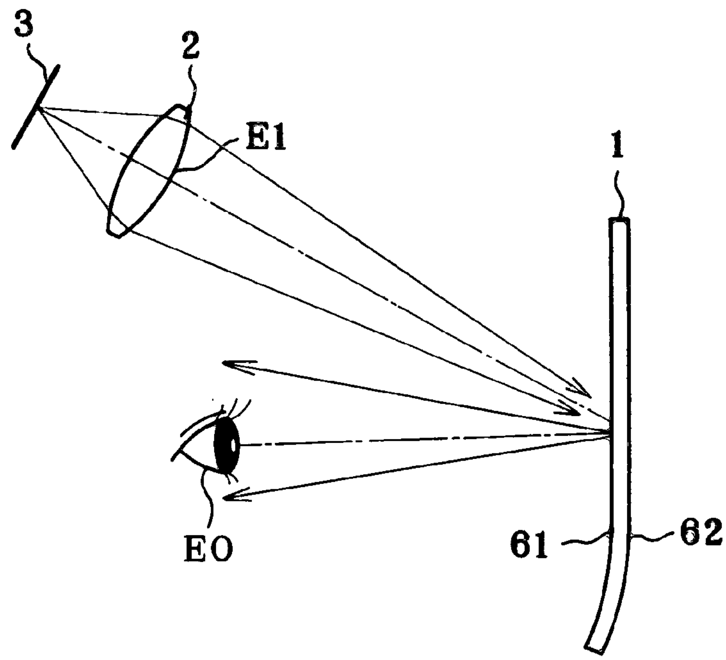
FIG. 14 is a view similar to FIG. 3, showing Example 2 of the present invention.
Figure 15:
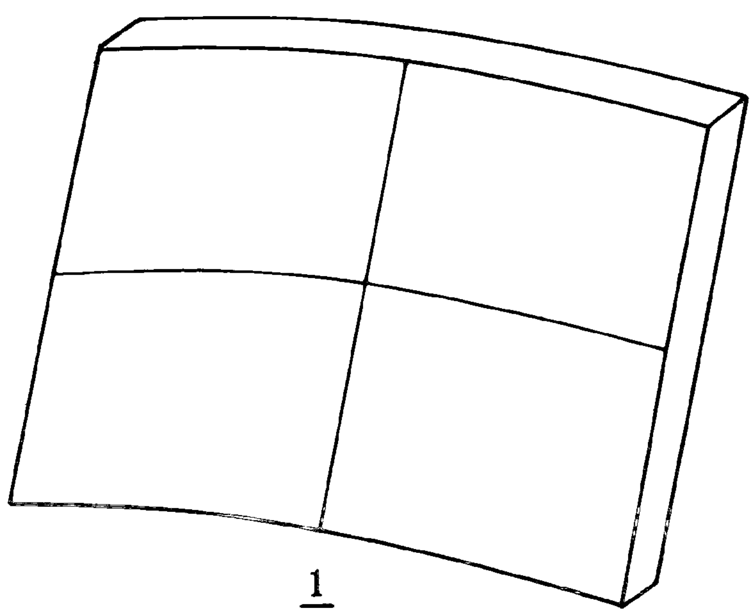
FIG. 15 is illustrative of another embodiment of how to curve the Fresnel reflecting mirror according to Example 2.

For correction of decentration aberration, the Fresnel reflecting mirror 1 should be configured as shown in FIG. 14. In FIG. 14, a Fresnel reflecting mirror 1 is curved at its lower end (−Y) portion toward a final pupil E0.

In this example, too, aberration remains in the X direction as shown in FIG. 13. This is because an astigmatic difference due to decentration in the X direction is still not well corrected. The amount of decentration aberration produced is about 8 mm as shown in FIG. 13.

In that case, the Fresnel reflecting mirror 1 should preferably be curved such that it takes a cylindrical form in the X direction. Such a form makes correction of the aforesaid decentration aberration feasible.

In addition, it is preferable to satisfy the following condition (1).

$$0<|E/EPD|<2 \qquad (1)$$

Here EPD is the diameter of an exit pupil E1 of a relay optical system 2, and E is the amount of aberration at the position of the final pupil E0.

When the Fresnel reflecting mirror 1 is curved in such a way as to satisfy the aforesaid condition (1), it is possible to correct or compensate for astigmatic differences and coma caused by decentration. It is consequently possible to achieve a display system that is so reduced in pupil aberration that the whole display surface can be well observed.

In the instant example, the angle of decentration is 25.5°. With an increasing angle of decentration, the amount of decentration aberration produced becomes drastically large. For instance, assume now that the diameter of the final pupil E0 is 10 mm. It is then preferable to curve the Fresnel reflecting mirror 1 or the Fresnel lens in such a way that the amount of aberration is reduced down to 20 mm or less. This enables the amount of aberration produced to be reduced whether the angle of decentration becomes greater or smaller than 22.5°.

More preferably, the following condition (1-1) should be satisfied.

$$0<|E/EPD|<1 \qquad (1\text{-}1)$$

To enlarge the pupil of the relay optical system 2, it is preferable to locate an optical surface having diffusion characteristics near the Fresnel surface. Here the diffusion characteristics are represented in terms of a given curve (graph) with diffusion angle as abscissa and light intensity as ordinate. If the diffusion angle of that optical surface is less than 10° (the full width half maximum angle), the optical surface can then have a relatively weak diffusion capability. In this case, it is important to satisfy the aforesaid condition (1-1) because there is noticeable pupil aberration.

The numerical data that provide the bases of the eyepiece optical systems according to Examples 1 and 2 are set out below.

In the following tables for constitutive parameters, “FS”, “ASS”, and “RE” indicate a Fresnel surface, an aspheric surface, and a reflecting surface, respectively.

It is here noted that the aspheric surface is defined by a rotationally symmetric aspheric surface given by the following defining formula (a):

$$Z=(y^2/R)/[1+\{1-(1+K)y^2/R^2\}^{1/2}] +Ay^4+By^6+Cy^8+Cy^{10}+\ldots \qquad (a=l)$$

where Z indicates an optical axis (axial chief ray) provided that the direction of propagation of light is defined as positive, y indicates a direction vertical to the optical axis, R is a paraxial radius of curvature, K is a conical coefficient, and A, B, C and D are the fourth-, sixth-, eighth- and tenth-order aspheric coefficients. The Z-axis in that defining formula gives the axis of the rotationally symmetric aspheric surface.

How to give decentration to the numerical data is now explained. At a position spaced away from a certain surface I by its thickness in the Z-axis direction there is a basic coordinates for I+1 surface. At a position decentered from the basic coordinates by the amount of decentration of the I+1 surface (decentering X, Y, Z and tilt α, β, γ), there is a defining coordinates for the I+1 surface. Then, the shape of the I+1 surface is determined by that defining coordinates.

Next, on the basis of the defining coordinates for the I+1 surface, a basic coordinates for I+2 surface is taken at a position spaced away by the surface thickness in the Z-axis direction. As is the case with the I+1 surface, the I+2 surface is defined by a defining coordinates defined by the amount of decentration. The same goes true for the subsequent surfaces. In other words, decentration is given on an integrative basis.

The decentering parameters X, Y, Z are the amounts of decentration in the X-, Y- and Z-axis directions at the basic coordinates, and the tilt parameters α, β, γ (°) are the angles of tilt around the X-, Y- and Z-axes. In that case, the positive direction for α and β is given by counterclockwise rotation with respect to the positive direction of the respective axes, and the positive direction for γ is given by clockwise rotation with respect to the positive direction of the Z-axis. It is noted that the parameters α, β and γ are rotated in the order of counterclockwise a rotation of the basic coordinates around the X-axis, then counterclockwise β rotation of a new coordinates around the Y-axis, and finally clockwise γ rotation of new another coordinates around the Z-axis.

EXAMPLE 1

| Surface No. | Radius of curvature | Surface separation | Displacement and tilt | Refractive index | Abbe's No. |
|---|---|---|---|---|---|
| 1 | ∞ (Object) | 600.00 | | | |
| 2 | ∞ | 1.00 | (1) | 1.4924 | 57.6 |
| 3 | −799.23 (FS, RE) (Stop) | −1.00 | (2) | 1.4924 | 57.6 |
| 4 | ∞ | −450.00 | (3) | | |
| 5 | ∞ (Image) | | | | |

Displacement and tilt(1)

| | | | | | |
|---|---|---|---|---|---|
| X | 0.00 | Y | 0.00 | Z | 0.00 |
| α | 22.50 | β | 0.00 | γ | 0.00 |

Displacement and tilt(2)

| | | | | | |
|---|---|---|---|---|---|
| X | 0.00 | Y | 103.06 | Z | 0.00 |
| α | 0.00 | β | 0.00 | γ | 0.00 |

Displacement and tilt(3)

| | | | | | |
|---|---|---|---|---|---|
| X | 0.00 | Y | −103.06 | Z | 0.00 |
| α | 0.00 | β | 0.00 | γ | 0.00 |

EXAMPLE 2

| Surface No. | Radius of curvature | Surface separation | Displacement and tilt | Refractive index | Abbe's No. |
|---|---|---|---|---|---|
| 1 | ∞ (Object) | 600.00 | | | |
| 2 | ∞ | 1.00 | 偏心(1) | 1.4924 | 57.6 |
| 3 | −798.59 (FS, RE) (Aspheric) (Stop) | −1.00 | 偏心(2) | 1.4924 | 57.6 |
| 4 | ∞ | −450.00 | 偏心(3) | | |
| 5 | ∞ (Image) F S | | | | |

Aspherical Coefficients

K = −0.59553
A = $-3.93600 \times 10^{-10}$
B = $1.16704 \times 10^{-14}$
C = $-4.58343 \times 10^{-20}$ Displacement and tilt(1)

| | | | | | |
|---|---|---|---|---|---|
| X | 0.00 | Y | 0.00 | Z | 0.00 |
| α | 22.50 | β | 0.00 | γ | 0.00 |

Displacement and tilt(2)

| | | | | | |
|---|---|---|---|---|---|
| X | 0.00 | Y | 102.86 | Z | 0.00 |
| α | 0.00 | β | 0.00 | γ | 0.00 |

Displacement and tilt(3)

| | | | | | |
|---|---|---|---|---|---|
| X | 0.00 | Y | −102.86 | Z | 0.00 |
| α | 0.00 | β | 0.00 | γ | 0.00 |

Example 3 of the present invention is now explained. When a Fresnel reflecting mirror is used as an eyepiece optical system, it is preferable to make the Fresnel reflecting mirror so thin that the Fresnel surface can more easily be curved. The instant example is directed to curving the Fresnel reflecting mirror.

Figure 16:
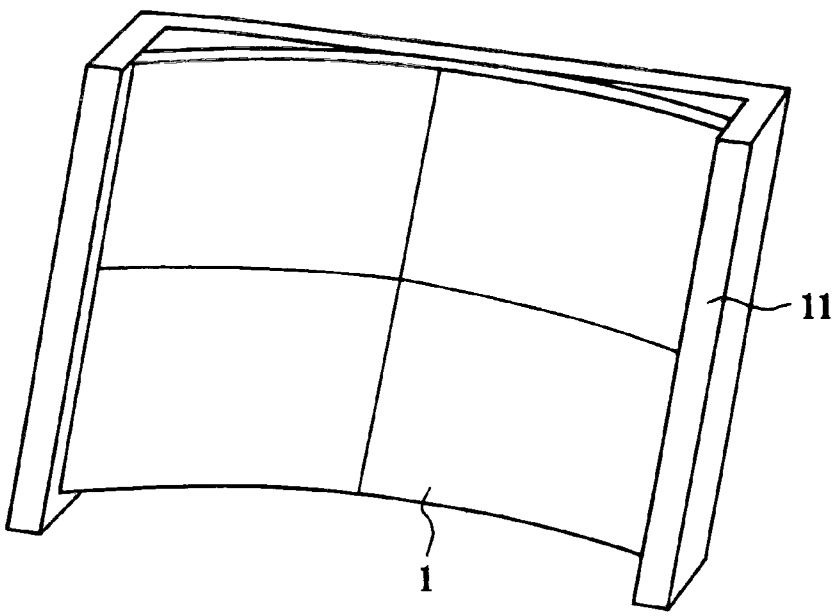
FIG. 16 is illustrative of how to curve the Fresnel reflecting mirror according to Example 3 of the present invention.

For correction of the astigmatic difference caused by decentration, it is effective to cylindrically curve the substrate of the Fresnel reflecting mirror 1, as already explained with reference to Examples 1 and 2. In the instant example, a keeper frame 11 is used as shown in FIG. 16.

The keeper frame 11 is provided at both ends with raised edges with a recess formed between them. The recess has a flat bottom surface. The length of the recess between the raised edges is so slightly shorter than the length of one side of the Fresnel reflecting mirror 1 that upon the Fresnel reflecting mirror 1 fitted into the recess, given lateral force is applied from both sides of the Fresnel reflecting mirror 1 to the recess. This in turn enables the Fresnel reflecting mirror 1 to be curved in a given form. At the same time, the keeper frame 11 functions as a holder for holding the Fresnel reflecting mirror 1 in place.

In the instant example, the force for holding the Fresnel reflecting mirror 1 in place can be controlled by an appropriate choice of the length of the recess. In other words, the amount of curvature of the Fresnel reflecting mirror 1 can properly be determined. According to the instant example, it is thus possible to optimize the amount of the aberration to be corrected in compliance with the amount of decentration of the Fresnel reflecting mirror 1 and, consequently, to correct for decentration aberration over a wider correction range.

It is then preferable to satisfy the following condition (2).

$$t/ED<0.05 \quad (2)$$

Here ED is the diagonal length of the Fresnel reflecting mirror 1 and t is the thickness of the Fresnel reflecting mirror 1.

As the upper limit of 0.05 to the aforesaid condition (2) is exceeded, the substrate of the Fresnel reflecting mirror 1 becomes thick, resulting in difficulty being encountered in curving the Fresnel reflecting mirror 1 in the given form.

More preferably, the following condition (2-1) should be satisfied.

$$t/ED<0.01 \quad (2\text{-}1)$$

If this condition is satisfied, it is easier to curve the Fresnel reflecting mirror 1.

Example 4 of the present invention is now explained. In this example, too, the Fresnel reflecting mirror is curved. In the instant example, a Fresnel reflecting mirror holder frame 12 is used. The Fresnel reflecting mirror holder frame 12 is similar in structure to the keeper frame 11 in Example 3. For correction of aberration caused by decentration, it is required to curve a Fresnel reflecting mirror 1 as already explained. The amount of curvature of the Fresnel reflecting mirror 1 can be pre-calculated by means of simulation or the like.

Figure 17:
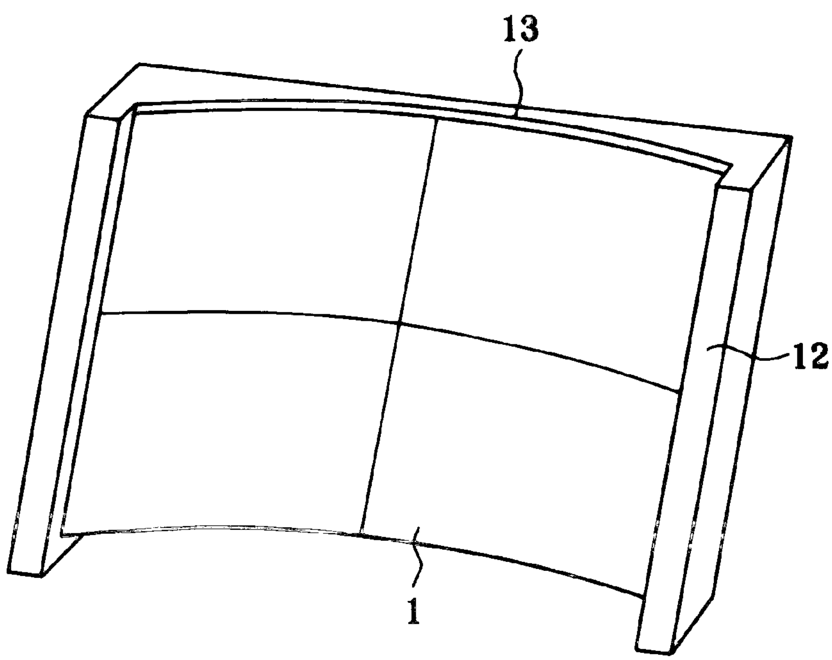
FIG. 17 is illustrative of how to curve the Fresnel reflecting mirror according to Example 4 of the present invention.

In the instant example, the bottom surface of the Fresnel reflecting mirror holder frame 12 is curved on the basis of the pre-calculated amount of curvature, as shown in FIG. 17. Therefore, if the Fresnel reflecting mirror 1 is urged against the Fresnel reflecting mirror holder frame 12, the Fresnel reflecting mirror 1 can then be curved in the desired form.

The feature of the instant example is that whenever the applied urging force has at least some strength, the given shape of curvature is obtainable. It is thus possible to curve the Fresnel reflecting mirror 1 constantly in the given form independent of conditions such as ambient temperature.

In the instant example, too, it is preferable to satisfy condition (2) or (2-1) in Example 3.

Example 5 of the present invention is now explained. In the instant example, too, the Fresnel reflecting mirror is curved. In the instant example, a Fresnel reflecting mirror support 14 is used. The Fresnel reflecting mirror support 14 is similar in structure to the Fresnel reflecting mirror holder frame 12. In the instant example, too, the surface of the support in contact with a Fresnel reflecting mirror 1 is curved on the basis of the pre-calculated amount of curvature of the Fresnel reflecting mirror 1.

Figure 18:
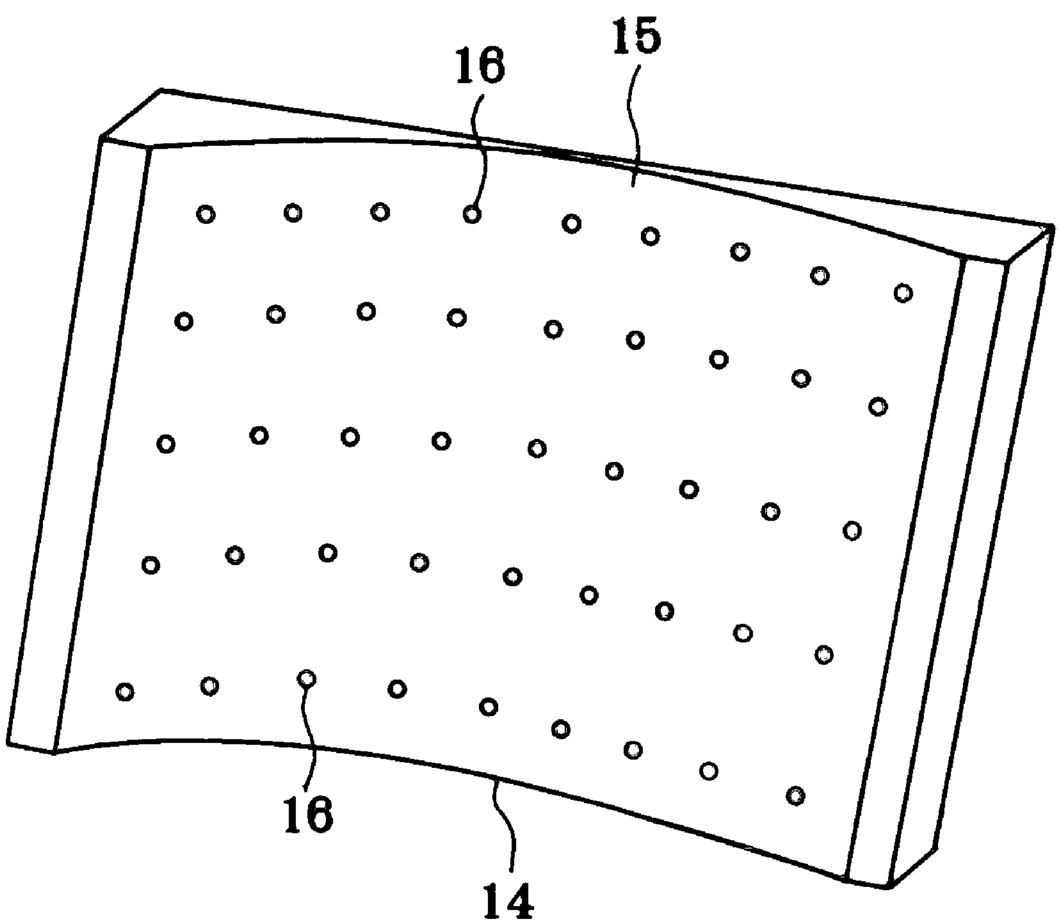
FIG. 18 is illustrative of how to curve the Fresnel reflecting mirror according to Example 5 of the present invention.

In this example, however, a number of suction holes 16 are formed in the surface 15 of the support as shown in FIG. 18. As suction force is applied via the suction holes 16, the Fresnel reflecting mirror 1 is curved following the shape of the surface 15. In this way, the Fresnel reflecting mirror 1 in the instant example can be curved. It is consequently possible to make correction for decentration aberration produced at the Fresnel reflecting mirror 1.

It is noted that the substrate of the Fresnel reflecting mirror 1 should preferably be thin. The thinner the substrate, the weaker the applied suction force becomes, resulting in no need of any bulky suction device.

More preferably, the following condition (2-2) should be satisfied.

$$t/ED<0.005 \quad (2\text{-}2)$$

If the aforesaid condition (2-2) is satisfied, the Fresnel reflecting mirror 1 can then be more easily curved in conformity with the surface 15, with weaker suction force.

Figure 19A:
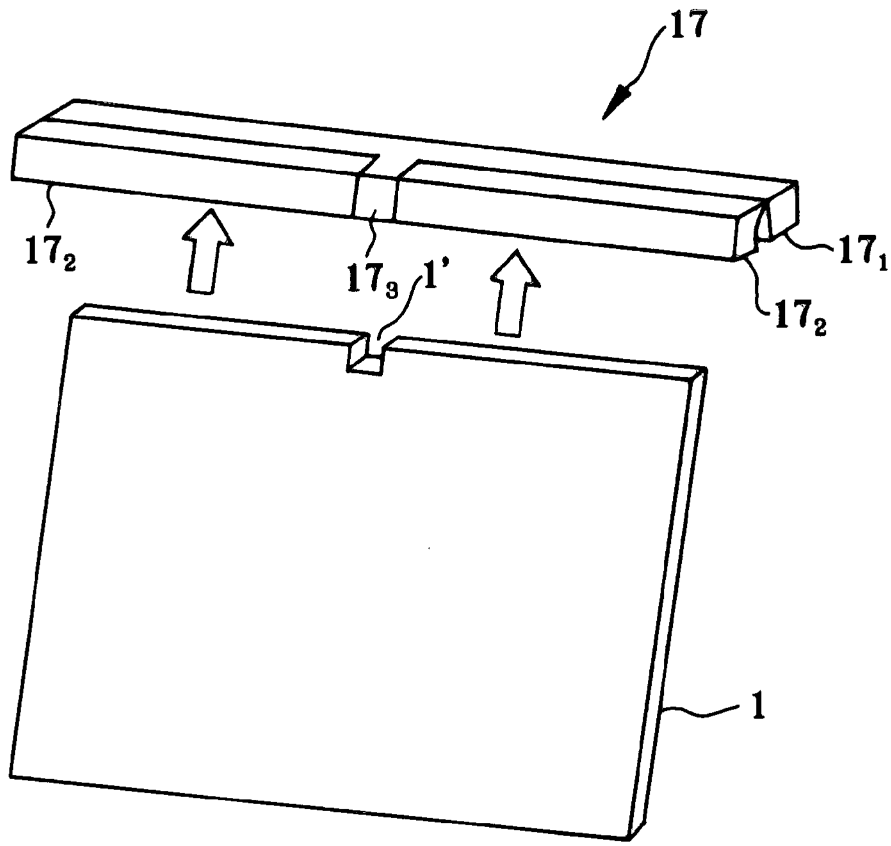
FIGS. 19(*a*) and 19(*b*) are illustrative of the mechanism for mounting the Fresnel reflecting mirror according to Example 6 of the present invention at a predetermined position in a given attitude.
Figure 19B:
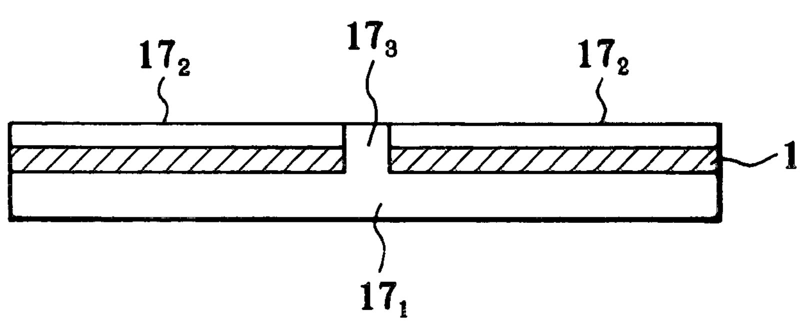

Example 6 of the present invention is now explained. This example is directed to a mechanism for mounting a Fresnel reflecting mirror 1 at a predetermined position of a display system while it is kept in a given attitude. Here the Fresnel reflecting mirror 1 is previously curved in a given form. FIG. 19(*a*) is a perspective view of the instant example, and FIG. 19(*b*) is a top view of a mounting member.

As depicted in FIG. 19(*b*), the Fresnel reflecting mirror 1 is provided in its one side with a cutout 1' that serves as a positioning means. On the other hand, a mounting member shown generally at 17 comprises a claw part $\mathbf{17}_1$, a pair of left and right claw parts $\mathbf{17}_2$ and a positioning projection $\mathbf{17}_3$. Combined with the claw parts $\mathbf{17}_2$, the claw part $\mathbf{17}_1$ functions as a gripping means. The positioning projection $\mathbf{17}_3$ is located between the pair of left and right claw parts $\mathbf{17}_2$. The claw part $\mathbf{17}_1$ cooperates with the claw parts $\mathbf{17}_2$ to support the Fresnel reflecting mirror 1 while its one side is gripped between them, using their resilient force.

The Fresnel reflecting mirror 1 is forced from the one side having cutout 1' in between the claw part $\mathbf{17}_1$ and the claw parts $\mathbf{17}_2$, whereupon the cutout 1' is fitted over the positioning projection $\mathbf{17}_3$ of the mounting member 17. Consequently, the aforesaid one side of the Fresnel reflecting mirror 1 is wedged between the claw part $\mathbf{17}_1$ and the claw parts $\mathbf{17}_2$, where it is gripped and held.

Attachment or detachment of the Fresnel reflecting mirror 1 can thus be repetitively carried out. Even when the attachment or detachment is repeated over and over, the Fresnel reflecting mirror 1 can be fixed constantly at the same position.

Figure 20:
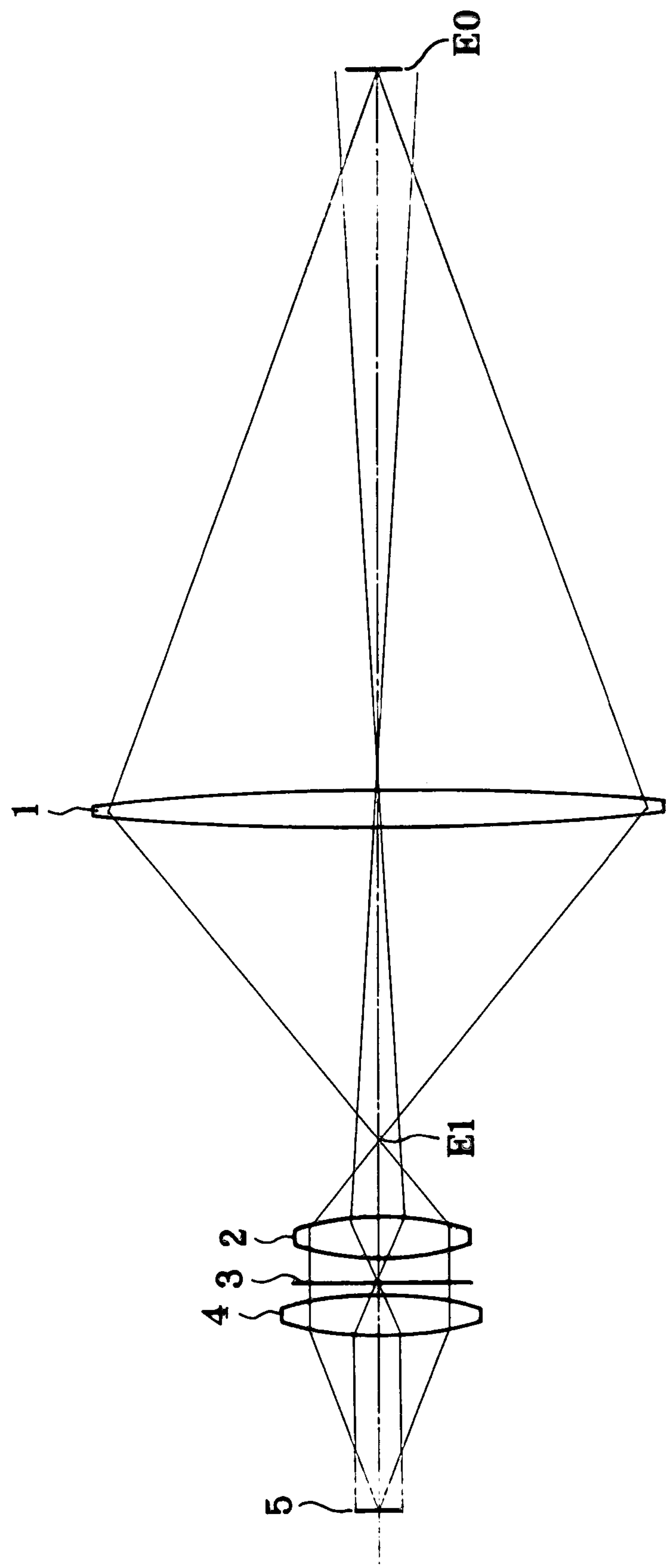
FIG. 20 is an optical path diagram for Example 7 of the present invention.

Example 7 of the present invention is now explained. The instant example is directed to an illumination means for a display device 3. An optical path diagram is shown in FIG. 20. The display device 3 used may be either a transmission type two-dimensional display device or a reflection type two-dimensional display device. In either case, a light source 5 is located at a position conjugate to an exit pupil E1 of a relay optical system.

With such an arrangement, light rays from the light source 5 are focused on the exit pupil E1 of the relay optical system without a loss. On the other hand, the exit pupil E1 and final pupil E0 of the relay optical system are conjugate to each other, and the eyeball of an observer is located at the position of the final pupil E0. Therefore, the light rays from the light source 5 can arrive at the eyeball of the observer without a loss. As a consequence, bright observed images can be obtained with reduced power. In FIG. 20, reference numeral 4 indicates a condenser lens for illumination purposes.

In FIG. 20, the display device 3 is of the transmission type. It is noted, however, that when the display device used is of the reflection type, the light source 5 and condenser lens 4 must be located on the side of an eyepiece optical system 1.

In FIG. 20, the eyepiece optical system 1 and relay optical system 2 are also shown as a transmitting lens. Even when a reflecting optical system or any other desired optical element is relied upon, however, it is possible to take a similar layout as mentioned above.

Thus, the whole optical system according to the instant example is set up in such a way that the exit pupil E1 and final pupil E of the relay optical system 2 have conjugate relations to each other.

More preferably, some diffusion capability should be imparted to the eyepiece optical system 1. This diffusion capability makes it possible to increase the size of a pupil image (pupil diameter) at the final pupil E0. If the size of the pupil image at the final pupil E0 is larger than the size of the pupil of the observer, no limitation is then imposed on the position of the eyeball (the iris) of the observer. In other words, even with the eyeball of the observer deviating more or less from the final pupil E0, the light rays are incident on the eyeball; even with a slight displacement of the eyeball of the observer, images can be observed. It is thus possible to provide an easy-to-observe display system.

Conversely, when the pupil image at the final pupil E is equal in size to the pupil of the eyeball of the observer, the size of the exit pupil E1 of the relay optical system 2 can be diminished. The reason is that the eyepiece optical system 1 has diffusion capability; even when the exit pupil E1 of the relay optical system 2 is small, the diffusion action ensures the same effect as is the case where the diameter of the exit pupil E1 of the relay optical system 2 is large. As a result, there is a margin in the ability of the relay optical system 2 to correct for aberrations, which contributes to a resolving power improvement. In addition, it is possible to enlarge the display screen or achieve size reductions of the display system.

Preferably, the eyepiece optical system 1 should satisfy the following condition (3) with respect to its diffusion capability.

$$D<40° \quad (3)$$

Here D (° ) is the value of the full width half maximum on a graph indicative of the diffusion characteristics.

As already referred to herein, the diffusion characteristics are represented in terms of the given curve (graph) with diffusion angle as abscissa and light intensity as ordinate. In most cases, this curve is bilaterally almost symmetrical with respect to a given diffusion angle (e.g., 0°). There are then two angles where the maximum intensity reduces by half. In other words, the full width half maximum means the width between those two points. As a matter of course, the value is given by the diffusion angle indicated by that width. It is noted that the diffusion characteristics are not always required to have symmetry.

As the upper limit of 40° to the condition (3) is exceeded, there is a drop of illumination efficiency upon the light source 5 projected onto the final pupil E0. Consequently, a very bright light source is required for the light source 5, resulting in a failure to meet power saving requirements.

More preferably, condition (3-1) should be satisfied.

$$D<20° \quad (3\text{-}1)$$

By satisfaction of this condition (3-1), further power savings are achievable.

Most preferably, condition (3-2) should be satisfied.

$$D<10° \quad (3\text{-}2)$$

By satisfaction of this condition (3-2), the greatest possible power savings are achievable.

In the value range for the aforesaid condition, the diffusion characteristics are determined such that the 1/10 full width becomes at most three times the full width half maximum. This makes the illumination effect more efficient. The 1/10 full width used herein is understood to mean the width between two points where 1/10 of the greatest intensity is obtained. As a matter of course, the value is given by the diffusion angle indicated by that width.

To be specific, the following conditions should preferably be satisfied in compliance with the aforesaid conditions (3), (3-1) and (3-2).

$$d<120° \quad (4)$$

$$d<60° \quad (4\text{-}1)$$

$$d<30° \quad (4\text{-}2)$$

Here d is the value of the 1/10 full width on the graph indicative of the diffusion characteristics.

By satisfaction of these conditions, bright images can be observed even when the light source 5 used is of the very low output type.

More preferably, an LED should be used for the light source 5. This ensures efficient illumination. The LED light source has good emission efficiency so that power consumptions can be kept low.

Alternatively, LEDs having wavelengths corresponding to R, G and B may be used as light sources. These LEDs, each having high color purity, can be so used for sequential illumination that the images displayed can be rendered in vivid colors.

Preferably, the following condition (5) should be satisfied.

$$WL<10W \quad (5)$$

Here WL is the power consumption of the light source.

At a power consumption of 10 W or lower, images can be observed with a battery or other power source over an extended period of time.

Figure 21:
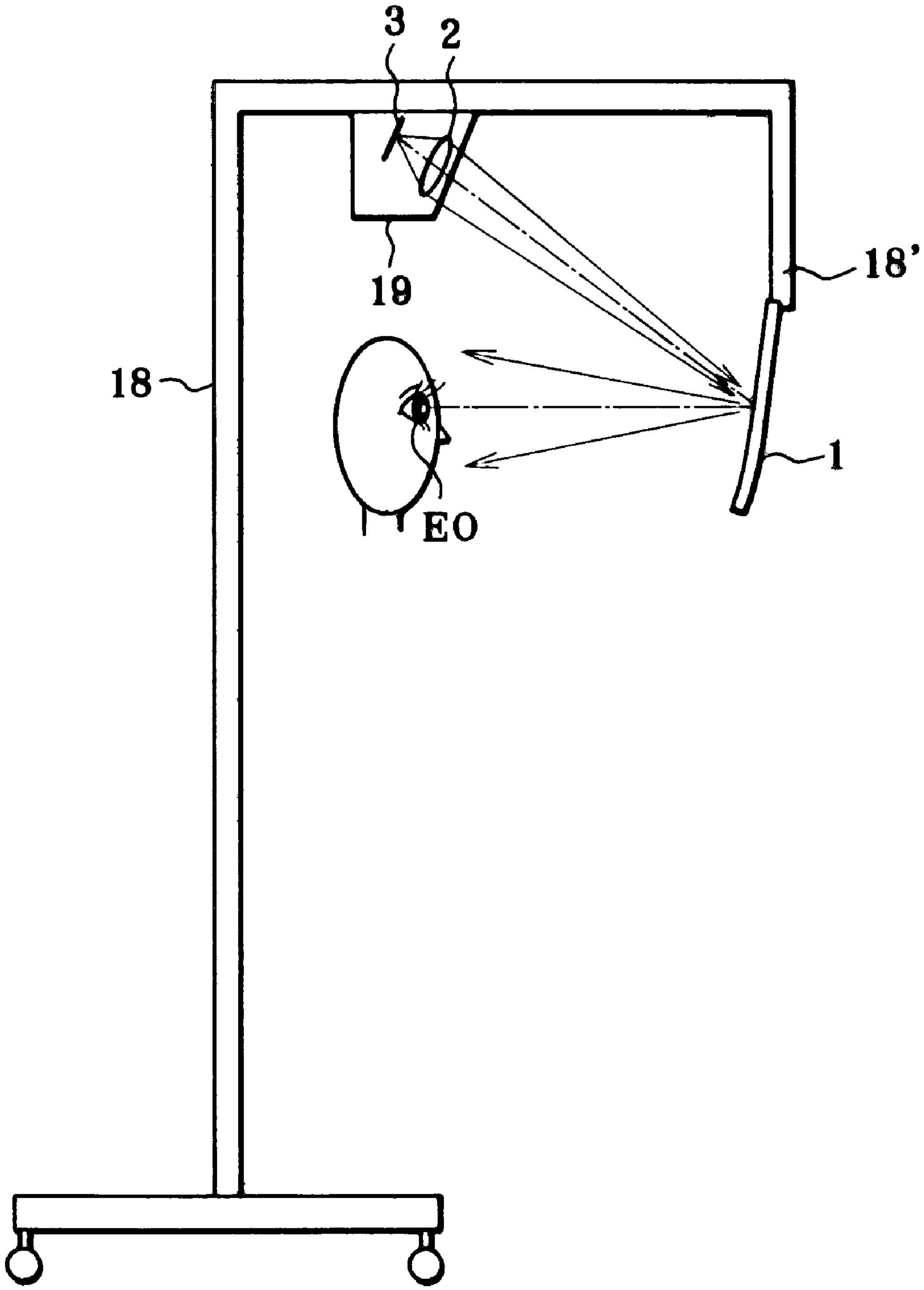
FIG. 21 is illustrative of one exemplary application of the display system according to the present invention.

As schematically shown in FIG. 21, the display system of the present invention may also have surgical applications where surgical microscopes, endoscopes, etc. are used. Of these tools, a surgical microscope is of large size and includes many movable parts. For this reason, it is necessary to apply a sterilization cover or the like over the whole. In this case, especially if the light source used has large power consumption, there is a problem that the heat of the light source is built up within the sterilization cover. This heat must be removed by means of an otherwise unnecessary separate means. Thus, it is of vital importance for a compact display system to make use of a light source having reduced power consumption.

More preferably, it is important to satisfy:

$$WL<1\ W \quad (5\text{-}1)$$

By satisfaction of this condition, it is possible to achieve a further reduction in the power consumption of a battery for driving the system. In other words, it is possible to reduce the size of the battery, thereby achieving further size and weight reductions.

In the example shown in FIG. 21, a stand 18 is movable. A Fresnel reflecting mirror 1 is attached to an end 18' of the stand 18 by means of such a mounting member 17 as used typically in Example 5. This enables the "attachment" or "detachment" of the Fresnel reflecting mirror 1. Here again, the Fresnel reflecting mirror 1 is of the given curved shape.

At a given position on the stand 18, a display unit 9 comprising a display device 3, a relay optical system 2 and a light source (not shown) is mounted. Various images appearing on the display device 3 are projected near the Fresnel reflecting mirror 1 via the relay optical system 2, so that an operator can view the images via the Fresnel reflecting mirror 1. Images appearing on the display device 3, for instance, include images from endoscopes, images from surgical microscopes and TV images. The results of preoperative inspections as well as images such as CT images, 3D graphic images resulting from the CT images and MRI images, too, may be displayed on the display device.

It is noted that in such display systems for medical purposes, the Fresnel reflecting mirror 1 may possibly have been contaminated during operation. It is thus desired that after each use, the Fresnel reflecting mirror 1 be replaced by new one.

Figure 22:
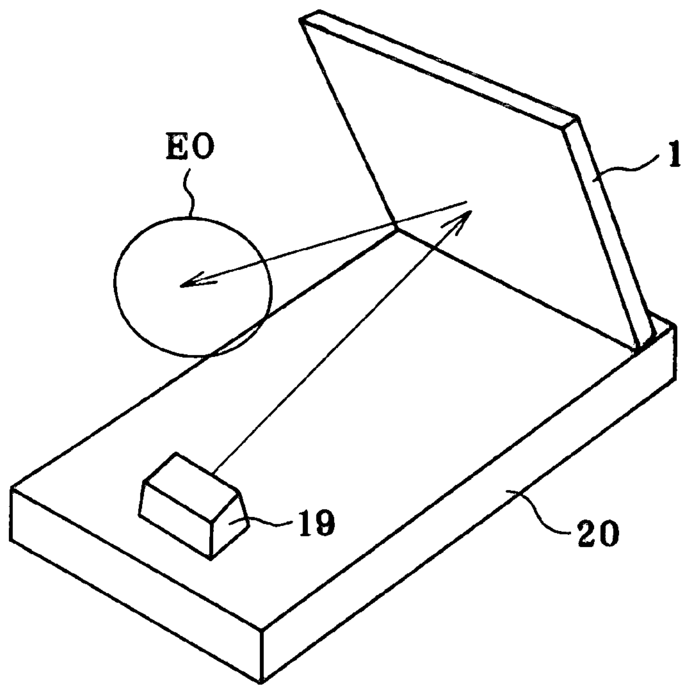
FIG. 22 is illustrative of another exemplary application of the display system according to the present invention.

As shown in FIG. 22, the display system of the present invention may also be designed as a portable compact one. In FIG. 22, one display unit 19 and one Fresnel reflecting mirror 1 are located on a substrate 20 of the system body. The Fresnel reflecting mirror 1 is mounted in such a way as to be foldable or erectable. The display unit 19 is located at a position that, upon the Fresnel reflecting mirror 1 folded down, is in no contact with the Fresnel reflecting mirror 1.

Figure 23:
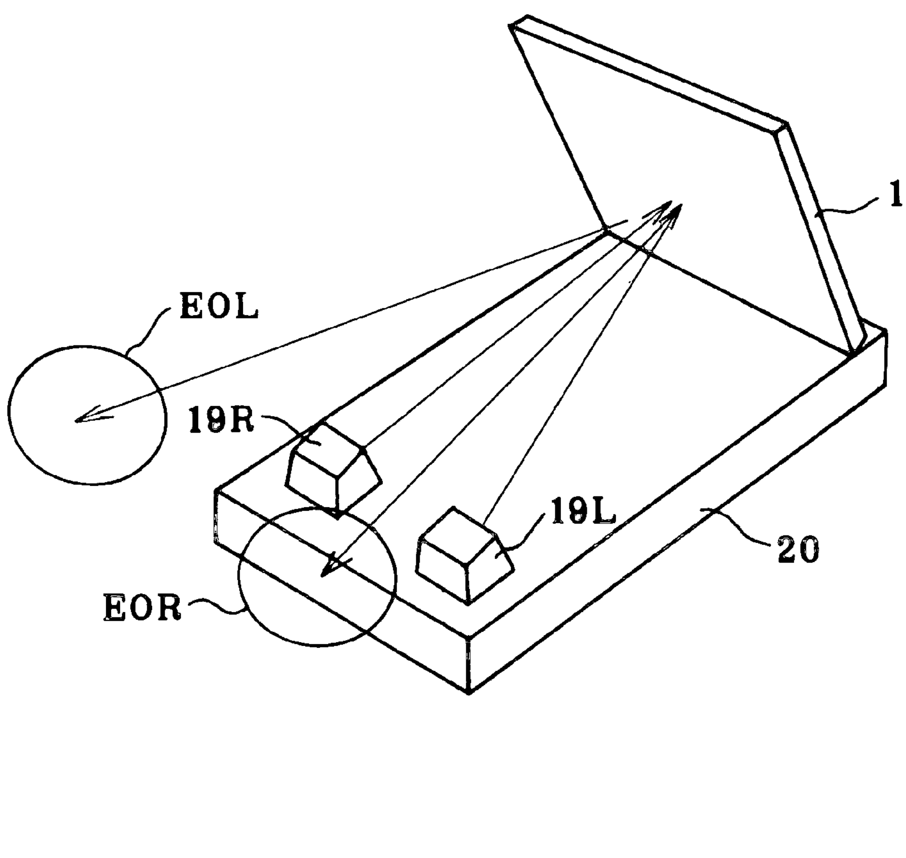
FIG. 23 is illustrative of a further exemplary application of the display system according to the present invention.

FIG. 23 is a modification to FIG. 22. In FIG. 23, two display units 19L, 19R and one Fresnel reflecting mirror 1 are located on a substrate 20 of the system body. The Fresnel reflecting mirror 1 is mounted in such a way as to be foldable or erectable. The display units 19L, 19R are located at a position that, upon the Fresnel reflecting mirror 1 folded down, is in no contact with the Fresnel reflecting mirror 1.

The display units 19L and 19R are located at a given interval. The image of an exit pupil (final pupil) of a relay optical system built in the display unit 19L is formed at a position E0L. On the other hand, the image of an exit pupil (final pupil) of a relay optical system built in the display unit 19R is formed at a position E0R. Accordingly, images can be observed by both eyes while the left and right eyeballs of an observer are in alignment with the positions of the final pupils E0L and E0R.

Suppose now that the display units 19L and 19R were located with the respective optical axes intersecting at a given angle, and that images of parallax were displayed on the display devices built in the display units 19L and 19R. Then, imagewise light of parallax is incident on the left and right eyeballs of an observer, so that the observer can view a 3D image.

So long as the final images E0L and E0R are at a symmetric position with respect to the Fresnel reflecting mirror 1, only the requirement for the curvature of the Fresnel reflecting mirror 1 is to correct for decentration aberration with respect to one pupil E0L or E0R.

Even with the system of FIG. 21 to which the same construction is applied, it is possible for the observer to view 3D images.

I claim:

1. A display system, comprising:

a display device having a display portion on which an image is to be displayed, a relay optical system having an entrance pupil and adapted for projection of the image, and an eyepiece optical system, comprising:

a substrate with a Fresnel surface formed thereon, wherein the Fresnel surface comprises rotationally symmetric concentric zones, and the substrate includes at least a curved area, wherein:

the eyepiece optical system forms a final pupil that is an image of the entrance pupil at a given position, and the relay optical system and the eyepiece optical system are located such that an axial chief ray emerging from the relay optical system is obliquely incident on the eyepiece optical system, with the proviso that the axial chief ray is defined by a light ray emerging from a center of the display portion, and passing through the relay optical system and then through a center of an exit pupil of the relay optical system, wherein the display system satisfies condition (1):

$$0<|E/EPD|<2 \quad (1)$$

where EPD is a diameter of the exit pupil of the relay optical system, and E is an amount of aberration at a position of the final pupil.

2. A display system, comprising:

a display device having a display portion on which an image is to be displayed, a relay optical system having an entrance pupil and adapted for projection of the image, and an eyepiece optical system, comprising:

a substrate with a Fresnel surface formed thereon, wherein the Fresnel surface comprises rotationally symmetric concentric zones, and the substrate includes at least a curved area, wherein:

the eyepiece optical system forms a final pupil that is an image of the entrance pupil at a given position, and the relay optical system and the eyepiece optical system are located such that an axial chief ray emerging from the relay optical system is obliquely incident on the eyepiece optical system, with the proviso that the axial chief ray is defined by a light ray emerging from a center of the display portion, and passing through the relay optical system and then through a center of an exit pupil of the relay optical system, wherein the display system further comprises:

a supporting column, a first arm joined to the supporting column, and a second arm joined to the first arm, wherein:

the display device and the relay optical system are held by the supporting column or the first arm at a position higher than the eyepiece optical system, the eyepiece optical system is held by the second arm, and the display device displays an image obtained from a surgical microscope or endoscope.

3. A display system, comprising:

a display device having a display portion on which an image is to be displayed, a relay optical system having an entrance pupil and adapted for projection of the image, and an eyepiece optical system, comprising:

a substrate with a Fresnel surface formed thereon, wherein the Fresnel surface comprises rotationally symmetric concentric zones, and the substrate includes at least a curved area, wherein:

the eyepiece optical system forms a final pupil that is an image of the entrance pupil at a given position, and the relay optical system and the eyepiece optical system are located such that an axial chief ray emerging from the relay optical system is obliquely incident on the eyepiece optical system, with the proviso that the axial chief ray is defined by a light ray emerging from a center of the display portion, and passing through the relay optical system and then through a center of an exit pupil of the relay optical system, wherein the display system further comprises:

a substrate of a system body, to which the display device, the relay optical system and the eyepiece optical system are attached, and wherein:

the display device and the relay optical system are located in opposition to the eyepiece optical system, the eyepiece optical system is foldable and erectable with respect to said substrate, and the display device and the relay optical system are located at a position away from the eyepiece optical system while the eyepiece optical system is folded down.

4. A display system, comprising:

a display device having a display portion on which an image is to be displayed, a relay optical system having an entrance pupil and adapted for projection of the image, and an eyepiece optical system, comprising:

a substrate with a Fresnel surface formed thereon, wherein the Fresnel surface comprises rotationally symmetric concentric zones and the substrate is in a plane-parallel shape, and a holder member for holding the substrate, wherein the holder member has a recess in which the substrate is held, wherein:

the eyepiece optical system forms a final pupil that is an image of the entrance pupil at a given position, and the relay optical system and the eyepiece optical system arc located such that an axial chief ray emerging from the relay optical system is obliquely incident on the eyepiece optical system, with the proviso that the axial chief ray is defined by a light ray emerging from a center of the display portion, and passing through the relay optical system and then through a center of an exit pupil of the relay optical system, wherein the display system satisfies condition (1):

$$0<|E/EPD|<2 \quad (1)$$

where EPD is a diameter of the exit pupil of the relay optical system, and E is an amount of aberration at a position of the final pupil.

5. A display system, comprising:

a display device having a display portion on which an image is to be displayed, a relay optical system having an entrance pupil and adapted for projection of the image, and an eyepiece optical system, comprising:

a substrate with a Fresnel surface formed thereon, wherein the Fresnel surface comprises rotationally symmetric concentric zones and the substrate is in a plane-parallel shape, and a holder member for holding the substrate, wherein the holder member has a recess in which the substrate is held;

wherein:

the eyepiece optical system forms a final pupil that is an image of the entrance pupil at a given position, and the relay optical system and the eyepiece optical system are located such that an axial chief ray emerging from the relay optical system is obliquely incident on the eyepiece optical system, with the proviso that the axial chief ray is defined by a light ray emerging from a center of the display portion, and passing through the relay optical system and then through a center of an exit pupil of the relay optical system, wherein said display system further comprises:

a supporting column, a first arm joined to the supporting column, and a second arm joined to the first arm, wherein:

the display device and the relay optical system are held by the supporting column or the first arm at a position higher than the eyepiece optical system, the eyepiece optical system is held by the second arm, and the display device displays an image obtained from a surgical microscope or endoscope.

6. A display system, comprising:

a display device having a display portion on which an image is to be displayed, a relay optical system having an entrance pupil and adapted for projection of the image, and an eyepiece optical system, comprising:

a substrate with a Fresnel surface formed thereon, wherein the Fresnel surface comprises rotationally symmetric concentric zones and the substrate is in a plane-parallel shape, and a holder member for holding the substrate, wherein the holder member has a recess in which the substrate is held, wherein:

the eyepiece optical system forms a final pupil that is an image of the entrance pupil at a given position, and the relay optical system and the eyepiece optical system are located such that an axial chief ray emerging from the relay optical system is obliquely incident on the eyepiece optical system, with the proviso that the axial chief ray is defined by a light ray emerging from a center of the display portion, and passing through the relay optical system and then through a center of an exit pupil of the relay optical system, and further comprising:

a substrate of a system body, to which the display device, the relay optical system and the eyepiece optical system are attached, and wherein:

the display device and the relay optical system are located in opposition to the eyepiece optical system, the eyepiece optical system is foldable and erectable with respect to said substrate, and the display device and the relay optical system are located at a position away from the eyepiece optical system while the eyepiece optical system is folded down.

7. The display system according to claim 1, which further comprises a light source for illuminating the display device, wherein the light source is a light-emitting diode.

8. The display system according to claim 1, which further comprises a light source for illuminating the display device, wherein the light source has a power consumption of 10 W or less.

* * * * *